United States Patent [19]
Kobayashi

[11] Patent Number: 6,108,728
[45] Date of Patent: Aug. 22, 2000

[54] CONTINUOUS RECORDING SYSTEM, METHOD, AND RECORDING MEDIUM RECORDING CONTINUOUS RECORDING PROGRAM AND CAPABLE OF BEING READ BY COMPUTER

[75] Inventor: Takahiro Kobayashi, Kawasaki, Japan

[73] Assignee: Fujitsu Limited, Kawasaki, Japan

[21] Appl. No.: 09/042,845

[22] Filed: Mar. 17, 1998

[30] Foreign Application Priority Data

Nov. 14, 1997  [JP]  Japan ................................ 9-313012

[51] Int. Cl.⁷ .................................................. G06F 13/00
[52] U.S. Cl. ............................... 710/74; 710/69; 710/29
[58] Field of Search ................................ 386/105, 125; 348/239, 715; 345/507; 360/15; 358/500; 710/72–74, 65–69, 58–61, 29–35

[56]  References Cited

U.S. PATENT DOCUMENTS

| | | | |
|---|---|---|---|
| 4,641,204 | 2/1987 | Sugiyama | 386/105 |
| 4,680,658 | 7/1987 | Tatami | 386/2 |
| 5,475,425 | 12/1995 | Przyborski et al. | 348/239 |
| 5,596,426 | 1/1997 | Ueno et al. | 358/500 |
| 5,602,845 | 2/1997 | Wahl | 370/395 |
| 5,841,597 | 11/1998 | Mashimo | 360/15 |
| 5,898,442 | 4/1999 | Takebe | 345/507 |
| 5,903,321 | 5/1999 | Tung et al. | 348/715 |
| 5,923,817 | 7/1999 | Nakamura | 386/125 |

FOREIGN PATENT DOCUMENTS 41150700  11/1997  Japan ............................. H04N 5/765

*Primary Examiner*—Christopher B. Shin
*Attorney, Agent, or Firm*—Staas & Halsey LLP

[57]  ABSTRACT

An analog video signal inputted from a video camera is converted into digital video data in a real-time manner by a real-time encoder and is transmitted. A video server has a plurality of storing devices, stores the inputted digital video data into any one of the storing devices in a real-time manner, and transmits the digital video data read out from any one of the storing devices to a video reproducing terminal apparatus. A long time recording processing unit stores the digital video data sent from the real-time encoder into the plurality of storing devices of the video server while sequentially switching the storing devices, thereby continuously recording the digital video data.

29 Claims, 26 Drawing Sheets

F I G. 3

| | 42 | |
|---|---|---|
| 52 | SWITCHING INTERVAL TIME | 01:00:00 | | | |
| 54 | PREFIX OF VIDEO FILE NAME | CAMERA1- | | | |
| 56 | VIDEO FILE SERIAL NUMBER | 5 | | | |
| 58 | STORED VIDEO FILE NAME | NSS1/DG1/CAMERA1-5.MP2 | | | |
| 60 | THE NUMBER OF DISK GROUPS ON THE STORAGE DESTINATION SIDE | 4 | | | |
| 62 | DISK GROUP ON THE STORAGE DESTINATION SIDE | NSS1/DG1 | NSS1/DG2 | NSS2/DG1 | NSS2/DG2 |

FIG. 4

| RECORDING DATA<br>LOCATION INFORMATION | RECORDING<br>START TIME | RECORDING<br>END TIME | FILE SIZE<br>(KB) |
|---|---|---|---|
| NSS1/DG1/CAMERA1-1.MP2 | 1997/09/01 10:00:00 | 1997/09/01 11:00:00 | 2764800000 |
| NSS1/DG2/CAMERA1-2.MP2 | 1997/09/01 11:00:00 | 1997/09/01 12:00:00 | 2764800000 |
| NSS2/DG1/CAMERA1-3.MP2 | 1997/09/01 12:00:00 | 1997/09/01 13:00:00 | 2764800000 |
| NSS2/DG2/CAMERA1-4.MP2 | 1997/09/01 13:00:00 | 1997/09/01 14:00:00 | 2764800000 |
| NSS1/DG1/CAMERA1-5.MP2 | 1997/09/01 14:00:00 | — | — |

FIG. 5

| DISK GROUP NAME | WHOLE CAPACITY | VACANT CAPACITY (KB) |
|---|---|---|
| NSS1/DG1 | 20000000000 | 16243657891 |
| NSS1/DG2 | 20000000000 | 8943215678 |
| NSS2/DG1 | 20000000000 | 12498765324 |
| NSS2/DG2 | 20000000000 | 20000000000 |

F I G. 6
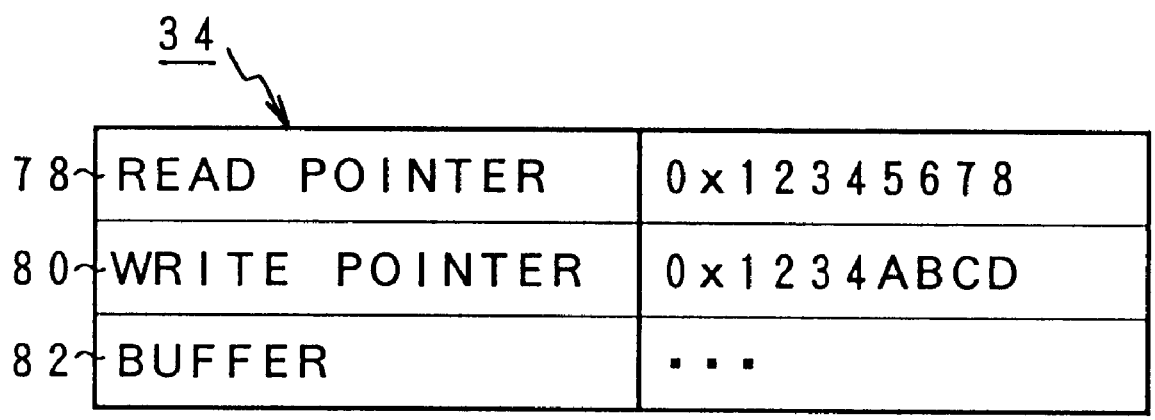

CONTINUOUS RECORDING SYSTEM, METHOD, AND RECORDING MEDIUM RECORDING CONTINUOUS RECORDING PROGRAM AND CAPABLE OF BEING READ BY COMPUTER

BACKGROUND OF THE INVENTION

The present invention relates to continuous recording system and method for storing an analog video signal inputted from a video camera to a video server while encoding the analog video signal to digital video data of MPEG2 or the like in a real-time manner and also relates to a recording medium in which a continuous recording program has been recorded and which can be read by a computer. More particularly, the invention relates to continuous recording system and method for continuously storing digital video data into a video server for a long time and also relates to a recording medium in which a continuous recording program has been recorded and which can be read by a computer.

Hitherto, in a system for unmanned-monitoring abnormality of a structure such as a debris barrier or the like which prevents a natural disaster, an object to be monitored is photographed by installing a video camera, and a video signal from the video camera is recorded on, for example, a video tape of a VTR apparatus. When abnormality such as a dam collapse occurs, the recorded video tape is reproduced and a state and causes of the abnormality are analyzed from the recorded monitor video image. A continuous recording system for recording a video image photographed by the video camera to a video tape is required to continuously record video images for a long time such as one month, one year, or the like and has to continuously record video images for a long time without dropping out any video image.

In the conventional continuous recording system for recording video images photographed by a video camera to a video tape, however, since the recording operation cannot be performed temporarily when the video tape is replaced, it is difficult to continuously record video images without dropping out any video image. In a case such that abnormality occurs during a tape replacement, consequently, there is a problem that a precious video image is lost. Since a recording time per video tape is limited, the number of recorded video tapes naturally increases. When abnormality occurs, since the relevant video image is searched while reproducing the video tape, enormous trouble and time are needed.

SUMMARY OF THE INVENTION

According to the invention, there is provided a continuous recording system for storing data encoded by a real-time encoder into a video server for a long time without dropping out any data.

A continuous recording system of the invention comprises: a real-time encoder for converting an analog video signal inputted from a video camera into digital video data in a real-time manner and transmitting; a video server which has a plurality of storing devices (disk groups) and stores the inputted digital video data into any one of the plurality of storing devices in a real-time manner and transmits the digital video data read from any one of the plurality of storing devices to a video reproducing terminal apparatus; and a long time recording terminal apparatus having a long time recording processing unit for sequentially storing the digital video data sent from the real-time encoder while switching the plurality of storing devices of the video server, thereby continuously recording the video data. The long time recording processing unit requests the video server to prepare a recording operation to a specific recording device on the basis of a recording start instruction, allows the real-time encoder to start an encoding on the basis of a notification of completion of the recording preparation from the video server, stores the transmitted digital video data into the storing device in the video server while receiving it, and monitors a predetermined switching interval time. The long time recording processing unit requests the video server to prepare the recording to the next storing device at a stage when the switching interval time approaches, establishes a recording preparation completion state in which the switching can be performed, and switches a storage destination of the digital video data from the storing device in which the data is at present being stored to another storing device in the recording preparation completion state at a time point when a switching timing corresponding to the switching interval time comes. According to such a continuous recording system of the invention, the video data having a length which exceeds a capacity of the storing device can be continuously recorded without interruption and the video image is not dropped out. In cooperation with a function for reproducing the video data during the storage, a video image during the recording can be also monitored. In cooperation with a database, a video image at an arbitrary time can be easily monitored among a number of video files. Further, by collectively showing video files of the plurality of storing devices as one file, a troublesomeness to switch the video images upon reproduction can be reduced.

The long time recording processing unit determines a storing device having a vacant capacity equal to a storing capacity corresponding to a preset switching interval time as a storage destination. If a storing device having a vacant capacity cannot be assured, the storing device having the oldest storage contents is erased and is determined as a next storage destination, thereby enabling a semipermanent recording operation to be performed. The long time recording processing unit has: a long time recording control block in which a predetermined switching interval time, a video file name to be stored, and the number and names of storing devices as storage destinations have been defined; a storing thread which is activated upon completion of the storage preparation of the video server, acquires a using right of a buffer for transfer provided for the real-time encoder and activates the encoder on the basis of definition information of the long time recording control block, thereby transmitting digital video data and storing into the storing device in the video server; and an encoder operation processing unit for transferring an operating instruction from the storing thread to the real-time encoder and allowing transmission of the digital video data to be controlled. The long time recording processing unit activates a new storing thread corresponding to a storing device on the switching destination side and establishes a recording preparation completion state at a stage near the switching interval time of the storing device in the video server, allows the old storing thread before the switching to release the buffer using right at the time point of switching, allows the new storing thread to acquire the buffer using right, and switches the storage of the digital video data to the next storing device. Further, there is provided a management server for managing the operations of the video server and the long time recording processing unit and resources of the video data stored in the video server. The management server comprises: a video data table for managing a file name, a recording start time, a recording end time, a file size, and the like of a video file stored in the storing device in the video server; a storing device information table (disk group information table) for managing a device name, a whole capacity, a vacant capacity, and the like of the storing device in the video server; and a contents manager for determining the storing device on the storage destination side in the video server by referring to the video data table and the storing device information table in response to a storage preparation request from the long time recording processing unit and responds a storage preparation completion.

In another embodiment of the long time recording processing unit, the switching operation to the next storage destination is prepared just after the start of the recording. That is, the preparation of recording to a specific storing device is requested to the video server on the basis of a recording start instruction, the encoding of the real-time encoder to which the completion of the recording preparation was notified from the video server is started, and the transmitted digital video data is stored into the storing device in the video server while being received. Just after the start of the storage to the storing device in the video server, the preparation of the recording to the next storing device is requested to the video server, and the recording preparation completion state in which the switching can be performed is established. By preliminarily obtaining the completion of the recording preparation to the next storage destination just after the start of the recording, a drop-out of the video data when an error occurs during the recording is minimized. The switching interval time is monitored and, at a time point when the switching interval time comes, the storage destination of the digital video data is switched from the storing device in which the data is at present being stored to another storing device in the recording preparation completion state.

In another embodiment of the long time recording processing unit, by storing the digital video data from the real-time encoder into two storing devices in the video server in parallel, reliability is increased. In this case, when the storage destination is switched to the next storing device, if the storage to both of the storing devices is normally finished, only the stored contents of one of the storing devices are left and the stored contents of the other storing device are erased. If the storage to one of the storing devices is normally finished and the storage to the other storing device is abnormally finished, the stored contents of the storing device in which the storage was normally finished are left.

In another embodiment of the long time recording processing unit, when a predetermined event occurs, the stored contents of the storing device from the occurrence of the event to a predetermined time in the past are read out and copied to another storing device for refuge. When all of video images which are recorded for a long time are not necessary and some event occurs, by storing the video images before the event, the necessary video images can be certainly stored with the necessary minimum capacity.

In another embodiment of the long time recording processing unit, high picture quality data and low picture quality data are transmitted from the real-time encoder and stored in two storing devices in the video server in parallel. When a predetermined event occurs, the high picture quality video data from the occurrence of the event to a predetermined time in the past is copied into the storing device for refuge and is left. When no event occurs, the low picture quality data is copied into the storing device for refuge at the time of switching of the storing device and is left. Since the capacity of the video data is proportional to the picture quality, the low picture quality data is stored when no event occurs, thereby reducing the storing capacity, and the high picture quality data of a predetermined time is left when an event occurs, thereby enabling an analysis of abnormality or the like to be performed by clear images.

The high picture quality data from the real-time encoder is a data stream of MPEG2 and the low picture quality data is a data stream of MPEG1. Occurrence of an event that is discriminated by the long time recording processing unit is determined by a detection signal of a sensor. The long time recording processing unit discriminates the event occurrence from the digital video data sent from the real-time encoder. For example, a large image change is detected from parameters of the data stream of MPEG2 sent from the real-time encoder and the event occurrence is discriminated. The storing device provided in the video server is a large capacity storing device using a disk array.

According to the invention, a continuous recording method for storing data encoded by a real-time encoder into a video server without dropping out any data for a long time is provided. The continuous recording method comprises:

a video data converting step of converting an analog video signal inputted from a video camera to digital video data in a real-time manner by a real-time encoder and transmitting;

a long time recording step of continuously recording the digital video data sent from the real-time encoder by storing the data while sequentially switching a plurality of storing devices in a video server; and a recording and reproducing step of reading out the digital video data stored in the storing device in the video server in a real-time manner and transmitting to a video reproducing terminal apparatus.

The details of the continuous recording method are basically the same as those of the system.

Further, according to the invention, there is provided a recording medium in which a continuous recording program for storing data encoded by a real-time encoder into a video server for a long time without dropping out any data has been recorded and which can be read by a computer. The recording medium has a long time recording processing module for continuously recording the digital video data from the real-time encoder which converts and transmits an analog video signal inputted from a video camera in a real-time manner by storing the data while sequentially switching the plurality of storing devices in the video server. The details of the recording medium are also basically the same as those in case of the system.

The above and other objects, features, and advantages of the present invention will become more apparent from the following detailed description with reference to the drawings.

BRIEF DESCRIPTION OF THE DRAWINGS

FIG. 3 is an explanatory diagram of a long time recording control block provided for a long time recording processing unit in FIG. 2;

FIG. 4 is an explanatory diagram of a video data table provided for a management server in FIG. 2;

FIG. 5 is an explanatory diagram of a disk group information table provided for the management server in FIG. 2;

FIG. 6 is an explanatory diagram of an encoding data buffer provided for a real-time encoder in FIG. 2;

DETAILED DESCRIPTION OF THE PREFERRED EMBODIMENTS

System Construction

Figure 1:
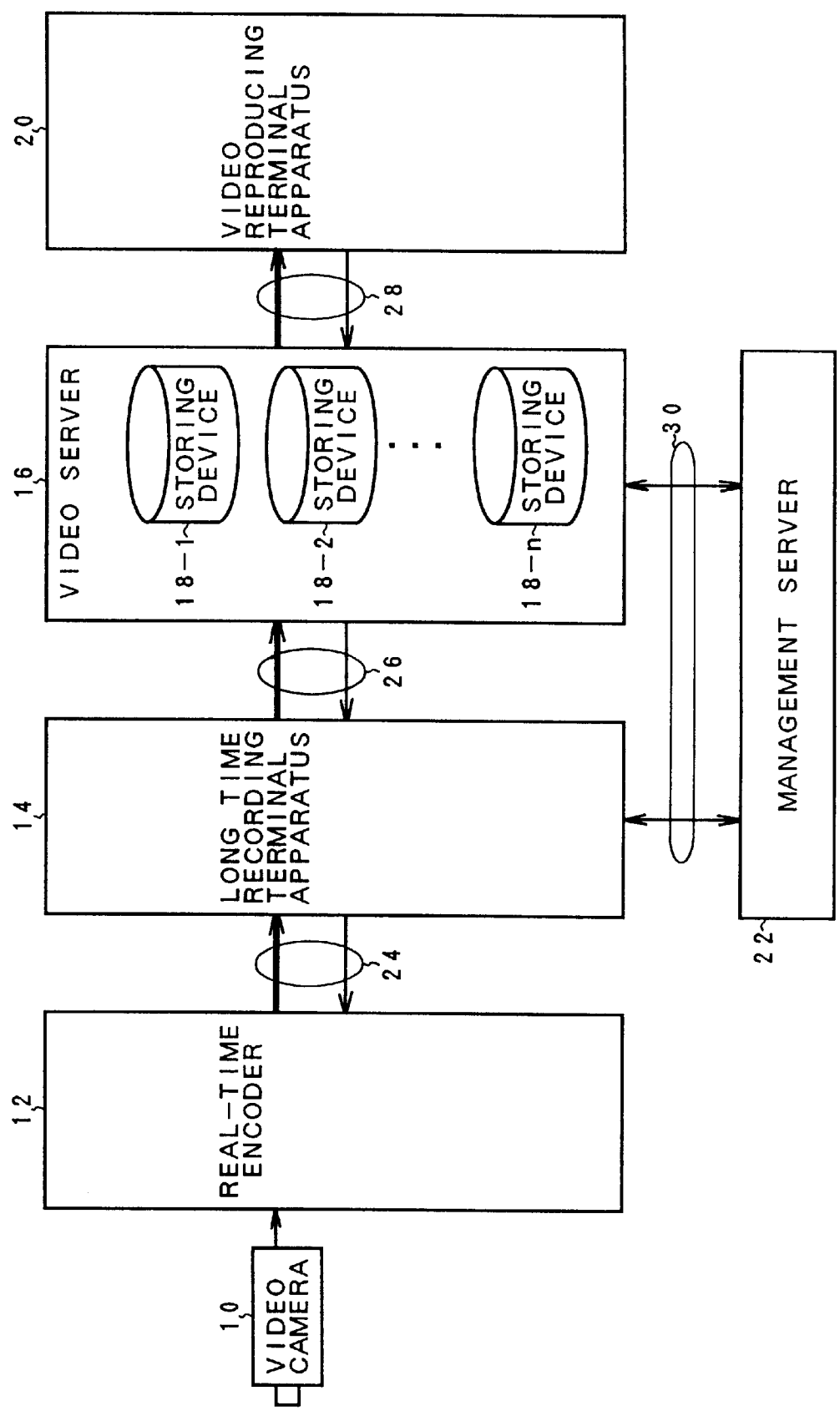
FIG. 1 is a block diagram of a system construction of the invention.

FIG. 1 is a block diagram of a system construction of a continuous recording system of the invention. The continuous recording system of the invention comprises: a video camera 10; a real-time encoder 12; a long time recording terminal apparatus 14; a video server 16; a video reproducing terminal apparatus 20; and a management server 22. The video camera 10 is installed at a photographing location as a monitoring target such as a debris barrier or the like and inputs a photographed color analog video signal to the real-time encoder 12 in a system activating state. As a video signal from the video camera 10, a color video signal of, for example, NTSC is used. The video camera 10 can be fixedly set or can be also constructed so as to horizontally or vertically operate a predetermined monitoring range by a servo motor or the like. The real-time encoder 12 converts the analog color video signal inputted from the video camera 10 into predetermined digital video data in a real-time manner and generates the converted data. For instance, the real-time encoder 12 converts the inputted color video signal of NTSC into a data stream of MPEG2 and/or MPEG1 and outputs the data stream. In this instance, ISO/IEC standard names in MPEG1 and MPEG2 are as follows.

| MPEG1: | ISO/IEC11172-2 video | Established in 1992 |
| | ISO/IEC11172-3 audio | Established in 1992 |
| MPEG2: | ISO/IEC13818-2 video | Established in 1994 |
| | ISO/IEC13818-3 audio | Established in 1994 |

The long time recording terminal apparatus 14 allows the real-time encoder 12 to start the encoding on the basis of a recording start instruction of the system, thereby storing the digital video data transmitted from the real-time encoder 12 into a storage destination of any one of disk groups 18-1 to 18-n as a plurality of storing devices provided in the video server 16 in a real-time manner. In this instance, the long time recording terminal apparatus 14 monitors a predetermined switching interval time based on a capacity which can be stored to each of the disk groups 18-1 to 18-n provided in the video server 16. For example, when the present time first approaches the switching interval time during the storage of the digital video data in which the disk group 18-1 is designated as a storage destination, the long time recording terminal apparatus 14 executes a storage preparing request to the disk group 18-2 as a next storage destination and forms a switching preparation completion state to the next storage destination before the present time reaches the switching interval time, thereby making it possible to switch to the next storage destination at a switching timing without dropping out the digital video data. The management server 22 manages the operations of the long time recording terminal apparatus 14 and video server 16 and also manages the storing states of the disk groups 18-1 to 18-n as storing devices provided in the video server 16 and recorded resources which have already been stored. As for video data stored in the video server 16, the video data is read out and transferred via an ATM network 28 on the basis of a reading request from the video reproducing terminal apparatus 20, so that the recorded image can be monitored by a monitor on the video reproducing terminal apparatus 20 side. The video data is transferred to the video reproducing terminal apparatus 20 in a real-time manner and can be also monitored by the monitor while storing into the video server 16.

Figure 2:
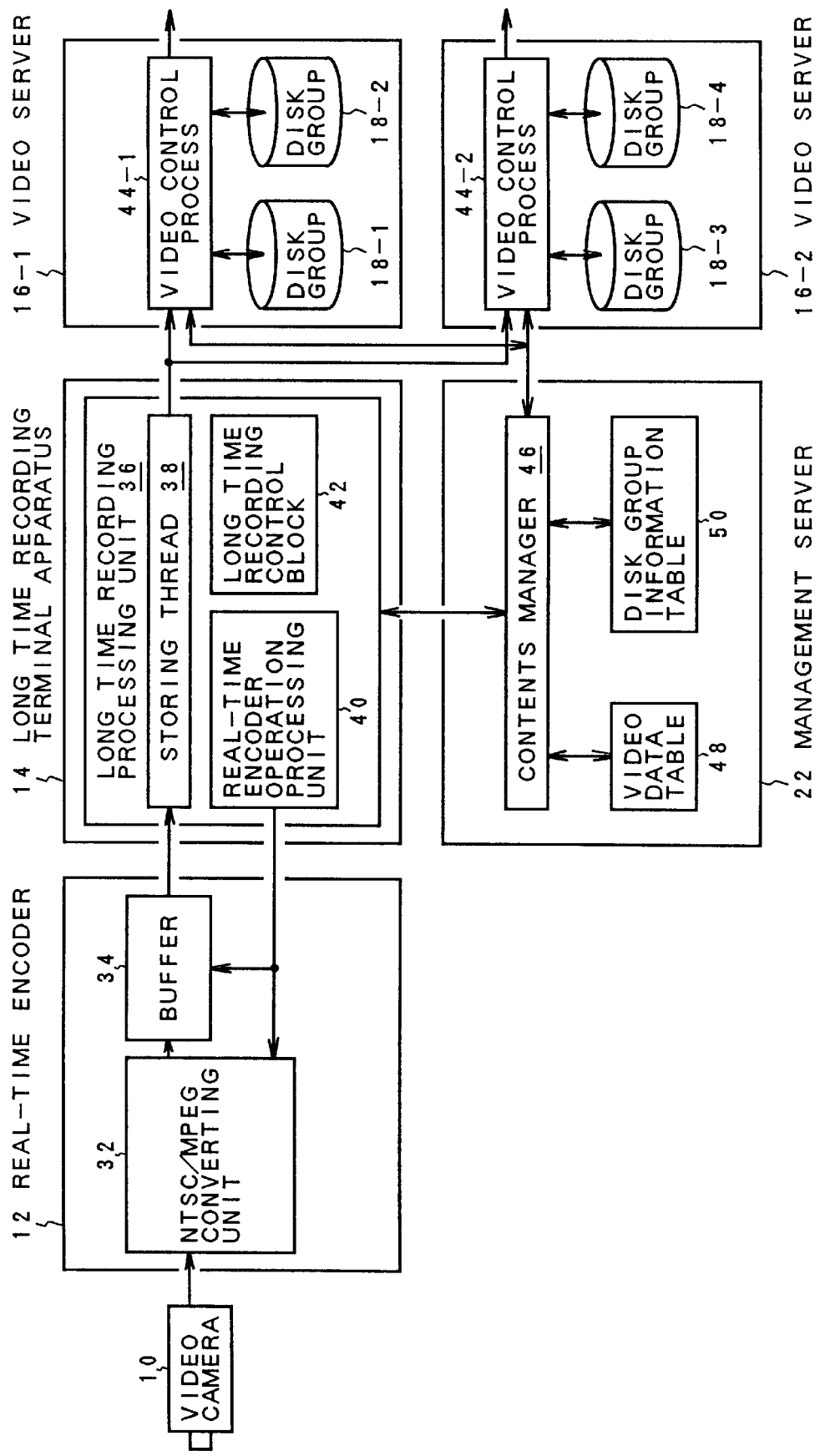
FIG. 2 is a block diagram of a functional construction of the invention.

FIG. 2 is a functional block diagram of the continuous recording system of FIG. 1. The real-time encoder 12 comprises an NTSC/MPEG converting unit 32 and a real-time encoding data buffer 34. The NTSC/MPEG converting unit 32 receives the NTSC color video signal serving as an analog video signal from the video camera 10, converts the video signal into the stream of the digital video data of MPEG1 or MPEG2, and transfers the stream to the long time recording terminal apparatus 14 through the real-time encoding data buffer 34. As such a real-time encoder 12, for example, FMM EP-202 manufactured by Fujitsu Ltd. can be used. In the normal using state, the real-time encoder 12 transmits the data stream of MPEG2 to the long time recording terminal apparatus 14. The long time recording terminal apparatus 14 is realized by a computer such as personal computer, workstation, or the like and realizes a function of a long time recording processing unit 36 by a continuous recording program provided by the invention. The long time recording processing unit 36 comprises: a storing thread 38; a real-time encoder operation processing unit 40; and a long time recording control block 42. The storing thread 38 is activated by a recording start instruction for the long time recording system and executes the transmission of the MPEG2 stream due to the encoding activation of the real-time encoder 12 and the storage of the MPEG2 stream to the video server side by capturing a using right of the real-time encoding data buffer 34 provided in the real-time encoder 12. When the disk groups on the video server side are switched, a new storing thread corresponding to the switching destination is activated in association with a switching preparation, a buffer using right of the storing thread before the switching is released at the switching timing, and the buffer using right is transferred to the new thread after the switching, thereby switching the storage destination of the MPEG2 stream. The real-time encoder operation processing unit 40 instructs the operating processes of the activation and stop of the encoding of the real-time encoder 12 by the storing thread 38 and the capture and release of the buffer using right. Various kinds of control parameters necessary for the processing operation of the long time recording processing unit 36 have been stored in the long time recording control block 42.

In FIG. 2, the video server 16 in FIG. 1 is divided into two video servers 16-1 and 16-2. The video server 16-1 has a video control process 44-1 and two disk groups 18-1 and 18-2. The video server 16-2 has a video control process 44-2 and two disk groups 18-3 and 18-4. Each of the disk groups 18-1 to 18-4 uses a disk array in which a plurality of data disks and one parity disk are constructed in a plurality of ranks. Each of the video control processes 44-1 and 44-2 performs the real-time writing to any one of the disk groups 18-1 to 18-4 serving as a storage destination of the MPEG stream from the real-time encoder 12 by an instruction from the long-time recording processing unit 36 via the management server 22. The video control processes 44-1 and 44-2 also transfer the MPEG data streams in a real-time manner or due to the reading from the disk group in response to a reproducing request from the video reproducing terminal apparatus 20 in FIG. 1. As video servers 16-1 and 16-2 as mentioned above, for example, a video server system (VSS) known as F6407A manufactured by Fujitsu Ltd. can be used. In the video server system, it is possible to properly select the disk groups within a range from the minimum construction of two groups to the maximum construction of 16 groups. In case of the two disk groups as a minimum construction in FIG. 2, 25.8 GB corresponding to a capacity in which the data stream of MPEG2 transmitted from the real-time encoder 12 at 6 Mbps can be recorded for about seven hours is guaranteed. As a transmitting speed of the ATM network from the long time recording terminal apparatus 14 to the video control precesses 44-1 and 44-2, 6 Mbps is guaranteed by using, for example, ATM-LAN. With respect to, for instance, ATM-LAN for the video reproducing terminal apparatus 20 side in FIG. 1, the transmitting speed depends on the number of video reproducing terminal apparatuses 20, namely, the number of clients. For instance, the transmitting speed is set to 6 Mbps for up to 44 clients, 3 Mbps for up to 64 clients, and 1.5 Mbps for up to 104 clients. It will be obviously understood that the ATM network 28 may be an ATM public network. The management server 22 comprises: a contents manager 46; a video data table 48; and a disk group information table 50. The video data table 48 stores and manages information regarding video files stored in the disk groups 16-1 to 16-4 provided in the video servers 16-1 and 16-2. Information regarding the disk groups 18-1 to 18-4 themselves provided in the video servers 16-1 and 16-2 has been stored and is managed in the disk group information table 50. The contents manager 46 decides the disk group serving as a storage destination having a vacant capacity requested by referring to the disk group information table 50 on the basis of a request from the long time recording processing unit 36 and provides the decided disk group to the long time recording terminal apparatus 14 and video servers 16-1 and 16-2 side. The contents manager 46 also records and updates information of the video files into the video data table 48 in accordance with the recording to the video servers 16-1 and 16-2 by the long time recording processing unit 36.

FIG. 3 shows the details of the long time recording control block 42 provided in the long time recording processing unit 36 in FIG. 2. In the long time recording control block 42, a switching interval time 52, a prefix of a video file name 54, a video file serial number 56, a stored video file name 58, the number 60 of disk groups on the storage destination side, and disk groups 62 on the storage destination side have been stored. According to the embodiment, the switching interval time 52 defines a time during which the data stream of MPEG2 transmitted from the real-time encoder 12 at 6 Mbps can be stored by a capacity of one disk group. For example, one hour is set as a switching interval time 52. As a prefix 54 of the video file name, since the video file name has been defined as "CAMERA1-5. MP2" in the embodiment, "CAMERA1-" as a prefix of the video file name is registered. As a next video file serial number 56, for example, "5" is registered. The stored video file name 58 is defined by "video server name, disk group name, and video file name". For instance, "/VSS1/DG1/CAMERA1-5. MP2" is registered. As the next number 60 of disk groups on the storage destination side, the four disk groups 18-1 to 18-4 in the video servers 16-1 and 16-2 in FIG. 3 are designated. The last disk groups 62 on the storage destination side are defined by combinations of the server names "VSS1 and VSS2" of the video servers 16-1 and 16-2 and the group names "DG1 and DG2" in accordance with the order of the disk groups 18-1, 18-2, 18-3, and 18-4.

FIG. 4 shows the video data table 48 provided in the management server 22 in FIG. 2. Information regarding the recording of video data to the disk groups 18-1 to 18-4 provided in the video servers 16-1 and 16-2 has been stored in the video data table 48. That is, recording data location information 64, recording start time 66, recording end time 68, and a file size 70 of an image file in which kilobyte is used as a unit have been registered in the video data table 48. Explaining in more detail, the stored video file names 58 in the long time recording control block 42 in FIG. 3 have been sequentially registered in the recording data location information 64 in accordance with the storing order. The recording start time 66 is shown by year/month/day and hour/minute/second. The recording end time 68 is also similarly shown by year/month/day and hour/minute/second. The file size 70 indicates a size of a recording file per disk group. Since the video data has been continuously stored in the whole region, the same size of 2,764,800,000 kB is set.

FIG. 5 is the disk group information table 50 provided in the management server 22 in FIG. 2. Information regarding the storage of the disk groups 18-1 to 18-4 provided in the video servers 16-1 and 16-2 has been registered in the disk group information table 50. That is, a disk group name 72, a whole capacity 74, and a vacant capacity 74 have been registered in the disk group information table 50.

FIG. 6 shows the encoding data buffer 34 provided in the real-time encoder 12 in FIG. 2. In the embodiment, the real-time encoder 12 and long time recording terminal apparatus 14 mutually transmit and receive the video data via the encoding data buffer 34 provided on the memory. Since the encoding data buffer 34 is used as a ring buffer, a control area is provided at the head, a read pointer 78 and a write pointer 80 are recorded, and the remaining portion is used as a buffer area 82.

Figure 7:
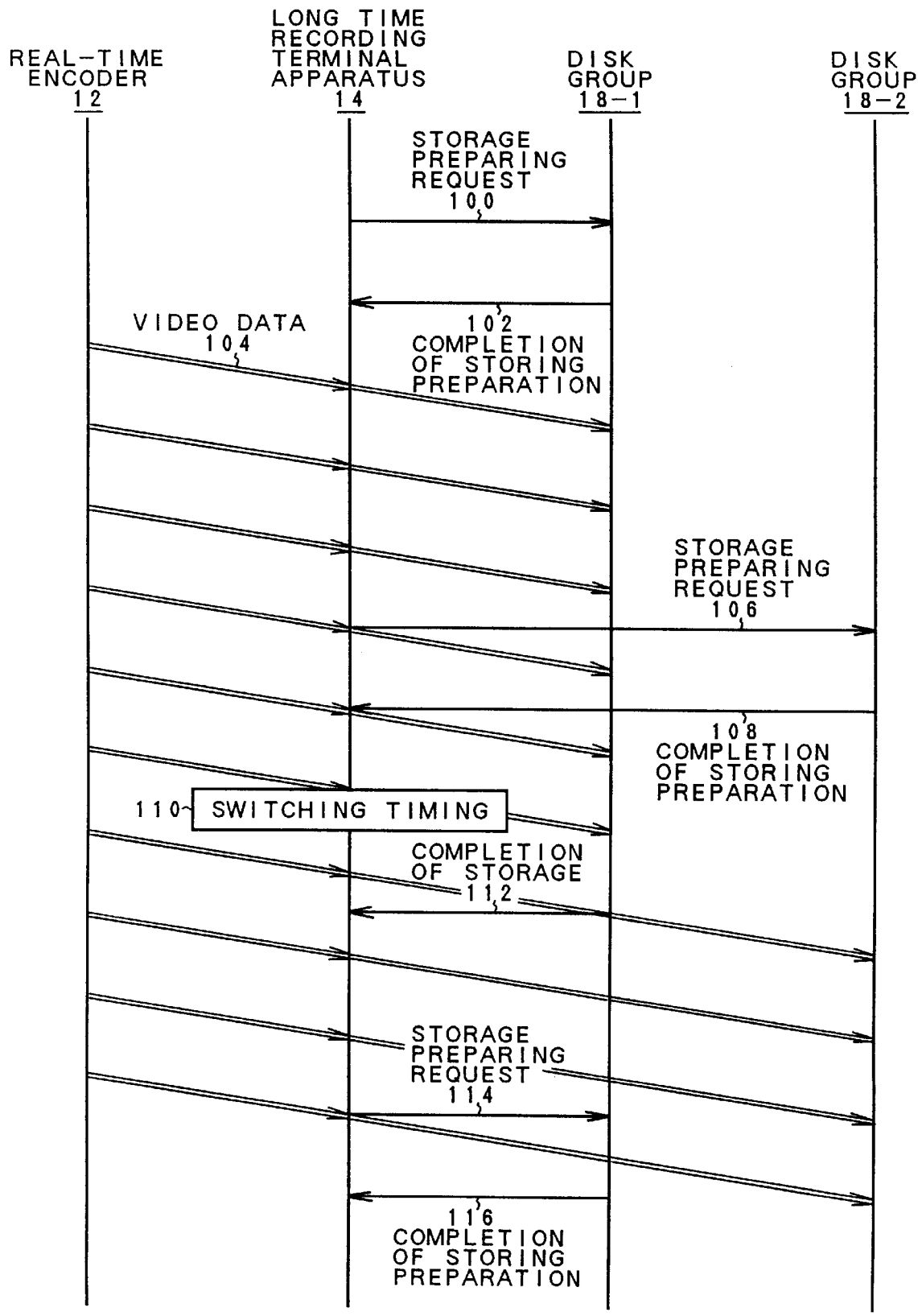
FIG. 7 is a time chart for a continuous recording process according to the invention.

FIG. 7 is a time chart of the continuous recording process of the invention which is performed in the system construction in FIG. 2. First, when the recording start is instructed to the long time recording terminal apparatus 14, the disk group 18-1 of the video server 16-1 is determined as a storage destination in the management server 22. On the basis of the decided disk group, a storage preparing request 100 is issued from the long time recording terminal apparatus 14 to the disk group 18-1, specifically speaking, to the video control process 44-1 of the video server 16-1 through the management server 22. When the storage preparation of the disk group 18-1 to the storage preparing request 100 is completed, a completion 102 of the storage preparation is responded to the long time recording terminal apparatus 14. The long time recording terminal apparatus 14 which received the response of the completion 102 of the storage preparation allows the real-time encoder 12 to start the encoding. Thus, a video signal from the video camera 10 is converted into video data 104 of MPEG2 in a real-time manner and is stored into the disk group 18-1 serving as a storage destination via the long time recording terminal apparatus 14 in a real-time manner. On the other hand, the long time recording terminal apparatus 14 monitors an arrival to, for example, one hour as a switching interval time to decide a switching timing 110 from the recording start to the next storage destination. When the present time approaches the switching timing 110, for example, the disk group 18-2 is decided as a next storage destination, a storage preparing request 106 is issued to the disk group 18-2, specifically speaking, to the video control process 44-1 of the video server 16-1 via the management server 22. It is sufficient to set a timing of the storage preparing request 106 into a time point which is preceding to the switching interval time by only a time necessary for the switching preparation. For example, it is sufficient to set the timing into a time point before one to a few minutes. When the storage preparing request 106 is received and the storage preparation of the disk group 18-2 is completed, the response of the completion 108 of the storage preparation is returned to the long time recording terminal apparatus 14. In this state, the long time recording terminal apparatus 14 establishes the storage preparation completion state for the next disk group 18-2 into a time point before the switching timing 110. After the completion 108 of the storage preparation was established, when arrival of the switching timing 110 due to the elapse of one hour serving as a switching interval time is determined, the long time recording terminal apparatus 14 switches the storage destination from the disk group 18-1 so far to the disk group 18-2 serving as a next storage destination in the storage preparation completion state and stores the video data from the real-time encoder 12 into the disk group 18-2 in a real-time manner. In this instance, when the storage destination of the video data is switched from the disk group 18-1 to the disk group 18-2, a response of a storage completion 112 is replied to the long time recording terminal apparatus 14 side by the disk group 18-1. On the management server 22 side, when the response is received, the recording end time 68 and file size 70 are registered into the video data table 48 in FIG. 4. The vacant capacity regarding the disk group 18-1 is updated in the vacant capacity 76 in the disk group information table 50 in FIG. 5. Subsequently, the long time recording terminal apparatus 14 restarts the time monitor of one hour serving as a preset switching interval time at the timing when the storage destination is switched to the disk group 18-2. When the present time approaches the next switching timing, for example, the disk group 18-1 is decided as a storage destination and a storage preparing request 114 is issued. When the storage preparation is completed in the disk group 18-1, a completion 116 of the storage preparation is replied. In this instance, since the past video data has already been stored in the disk group 18-1 and there is no vacant area, old recorded data in the disk group 18-1 is erased in response to the storage preparing request 114, a vacant capacity necessary for the next recording is assured, and after that, the completion 116 of the storage preparation is replied. Consequently, in the continuous recording process of the time chart of FIG. 7, the video data from the real-time encoder 12 is continuously recorded while alternately switching the disk groups 18-1 and 18-2 every preset switching interval time.

Figure 8:
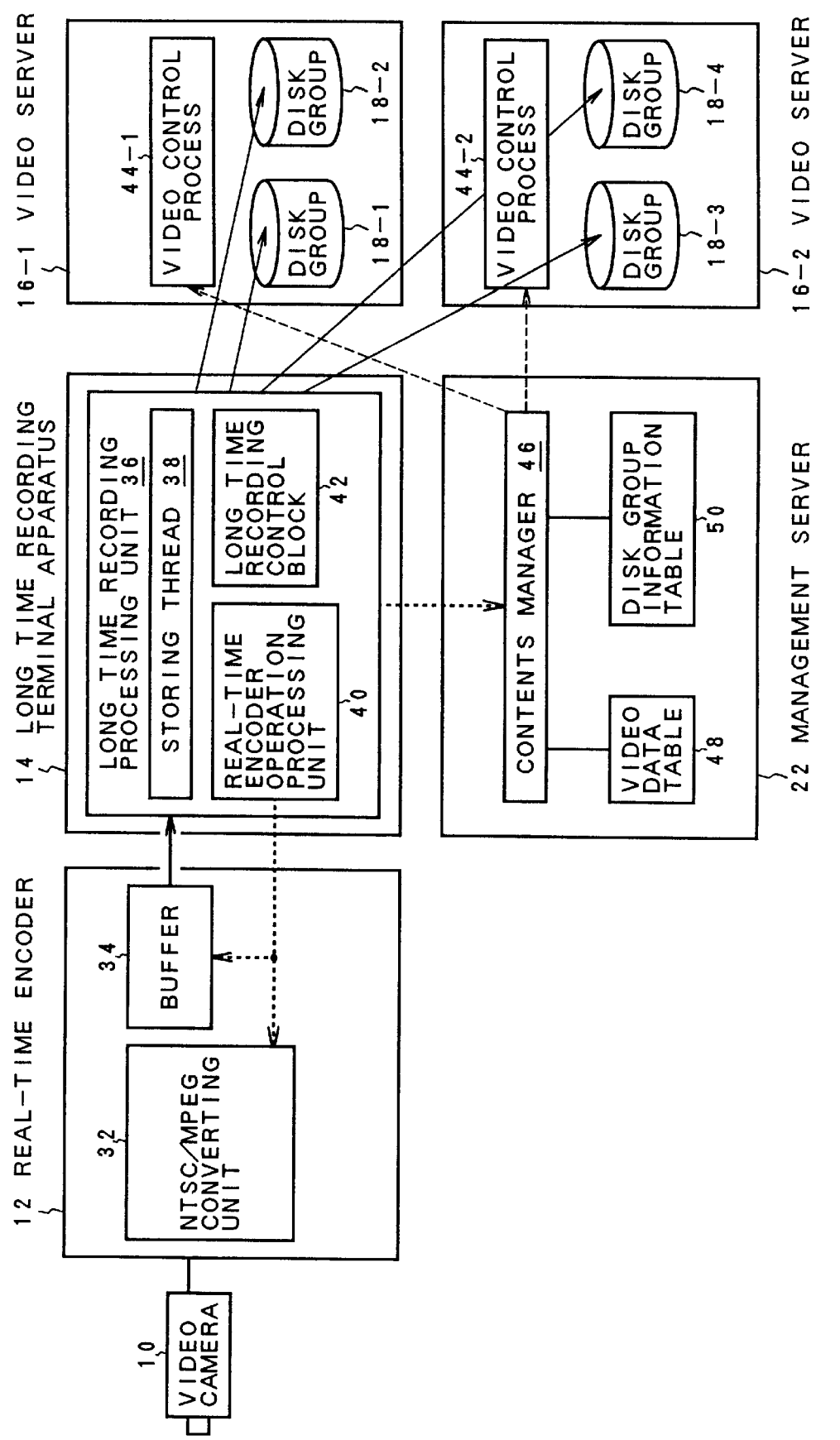
FIG. 8 is a block diagram of flows of video data and control signals in the continuous recording process of the invention.

FIG. 8 shows flows of the video data and the control signals in the continuous recording process by the time chart of FIG. 7 with respect to the functional block diagram in FIG. 2. When receiving the recording start instruction, the long time recording processing unit 36 of the long time recording terminal apparatus 14 requests the determination of the storage destination to the management server 22. In response to the request, the contents manager 46 of the management server 22 decides, for example, the disk group 18-1 of the video server 16-1 as a first storage destination with reference to the video data table 48 and disk group information table 56. The long time recording processing unit 36 accepts the connection of the disk group 18-1, so that the preparation is completed. When the preparation of the storage destination is completed, the long time recording processing unit 36 activates the storing thread 38 and activates the encoding of the NTSC/MPEG converting unit 32 of the real-time encoder 12 via the real-time encoder operation processing unit 40. Simultaneously, the stream of MPEG2 video data is transmitted by capturing the using right of the real-time encoding data buffer 34 and the video data is written into the disk group 18-1 of the video server 16-1 serving as a first storage destination in a real-time manner under the control by the video control process 44-1. During the real-time storage of the video data to the disk group 18-1, the long time recording processing unit 36 monitors the switching interval time set by the long time recording control block 42. When the present time approaches the switching timing by the switching interval time, the long time recording processing unit 36 activates a new storing thread which is used for the recording of the next storage destination and further issues a preparing request of the next storage destination to the management server 22. When receiving the storage preparation request, the contents manager 46 of the management server 22 decides, for example, the disk group 18-2 of the video server 16-1 as a next storage destination with reference to the video data table 48 and disk group information table 50. When a vacant capacity can be assured, the contents manager 46 connects the disk group 18-2 to the long time recording processing unit 36. When the present time reaches the switching timing in the storage preparation completion state of the disk group 18-2 serving as a next storage destination, the using right of the real-time encoding data buffer 34 of the real-time encoder 12 owned by the storing thread 38 in which the video data had been stored in the disk group 18-1 is released, the buffer using right is transferred to the new storing thread activated in correspondence to the disk group 18-2 serving as a next storage destination. Therefore, the storage of the data stream of MPEG2 from the real-time encoder 12 to the disk group 18-1 is finished and the mode is switched to the start of storage to the disk group 18-2. In association with the end of storage to the disk group 18-1 at the switching timing, the contents manager 46 of the management server 22 updates necessary information in the video data table 48 and disk group information table 50. In a manner similar to the above, the continuous recording of the video data by the switching of the storage destination according to the order of the disk groups 18-1, 18-2, 18-3 and 18-4 is repeated at, for example, every switching timing for determining the set switching interval time.

Continuous Recording Process

Figure 9:
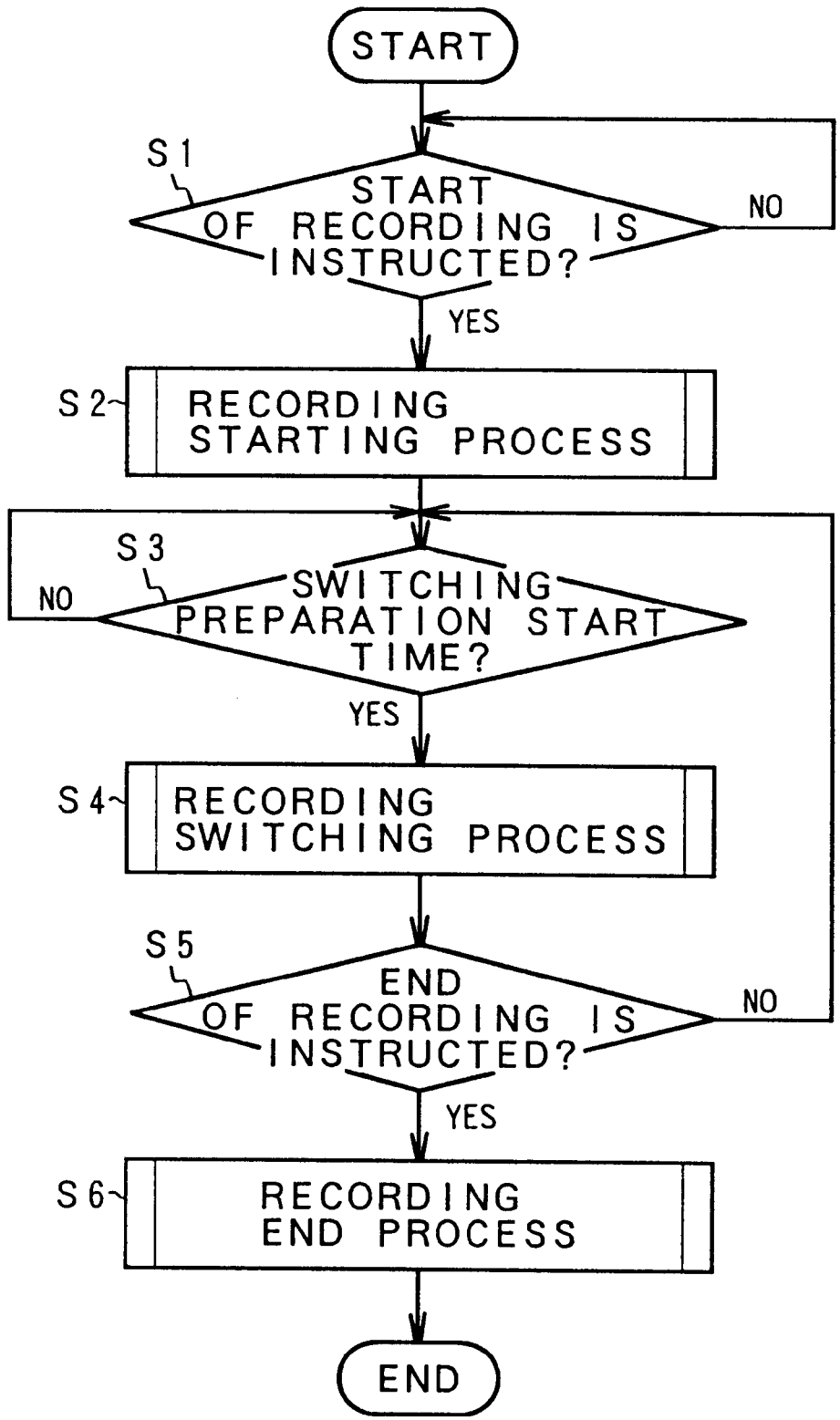
FIG. 9 is a flowchart for the continuous recording process according to the invention.

FIG. 9 is a flowchart for the whole continuous recording process according to the invention. When a recording start instruction is received in step S1, a recording starting process is executed in step S2. In step S3, a check is made to see if the present time is a switching preparation start time. When the present time reaches the switching preparation start time, a recording switching process is executed in step S4. When the recording switching process is finished, the presence or absence of a recording end instruction is discriminated in step S5. Until the recording end instruction is issued, the discrimination about the switching preparation start time in step S3 and the recording switching process in step S4 are repeated. When there is the recording end instruction in step S4, a recording end process is executed in step S6.

Figure 10:
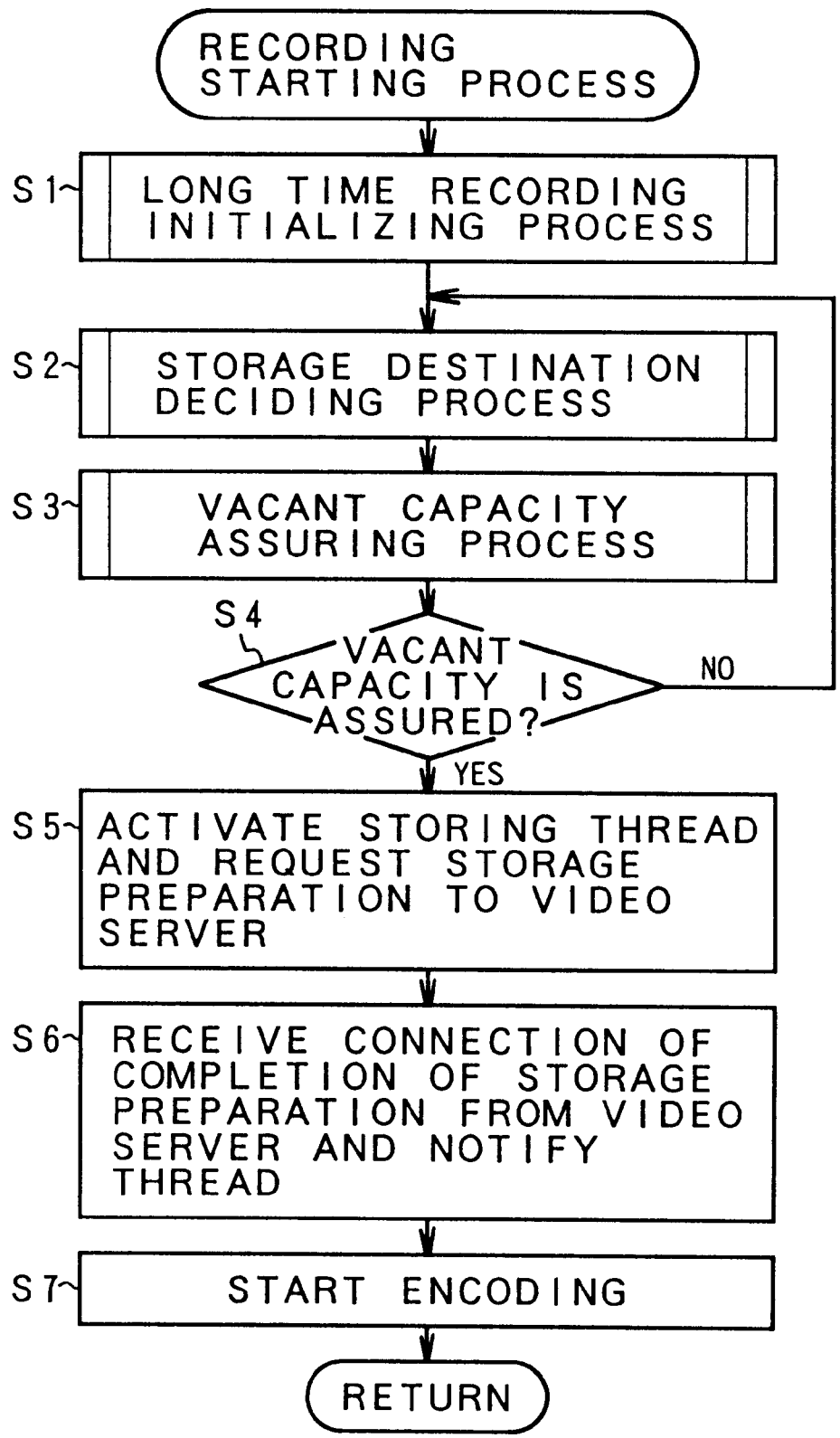
FIG. 10 is a flowchart for a recording starting process in FIG. 9.
Figure 11:
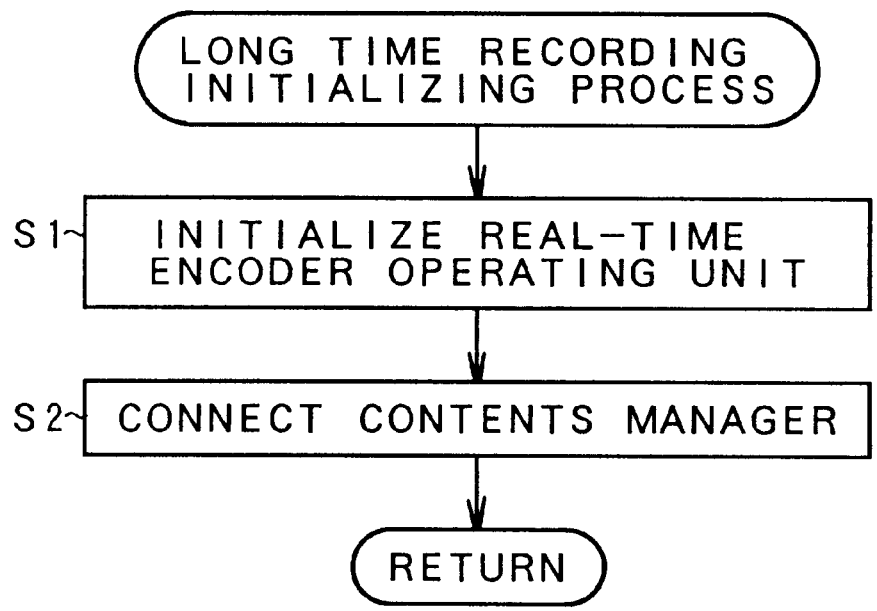
FIG. 11 is a flowchart for a long time recording initializing process in FIG. 10.
Figure 12:
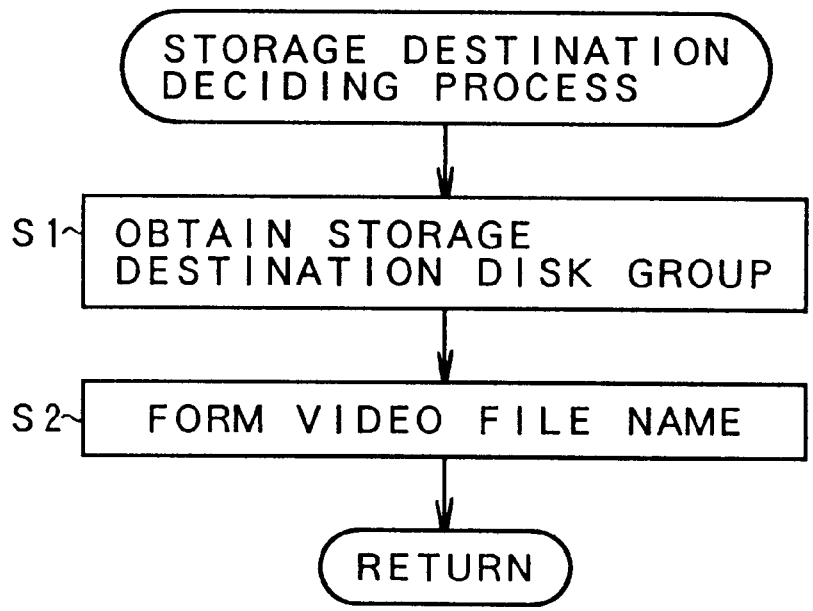
FIG. 12 is a flowchart for a storage destination deciding process in FIG. 10.

FIG. 10 shows the details of the recording starting process in step S2 in FIG. 9. When a recording start instruction is issued to the long time recording processing unit 36, the long time recording terminal apparatus 14 executes a long time recording initializing process in step S1. As shown in a flowchart of a subroutine of FIG. 11, in the long time recording initializing process, the initialization of the real-time encoder operation processing unit 40 and the connection of the contents manager 46 provided in the management server 22 are executed in step S1. A storage destination deciding process is executed in step S2 in FIG. 10. In the storage destination deciding process, as shown in a flowchart of a subroutine of FIG. 12, as a head element, for example, the disk group 18-1 serving as "/VSS1/DG1" is captured as a storage destination disk group from the storage destination disk groups 62 of the long time recording control block 42 in FIG. 3 in step S1. In step S2, as a video file name of the captured storage destination disk group 18-1, a video file name "/VSS1/DG1/CAMERA1-5. MP2" is formed by a combination of the prefix 54 of the video file name and video file serial number 56 of the long time recording control block 42 in FIG. 3 and the storage destination disk group 62 captured in step S1.

Figure 13:
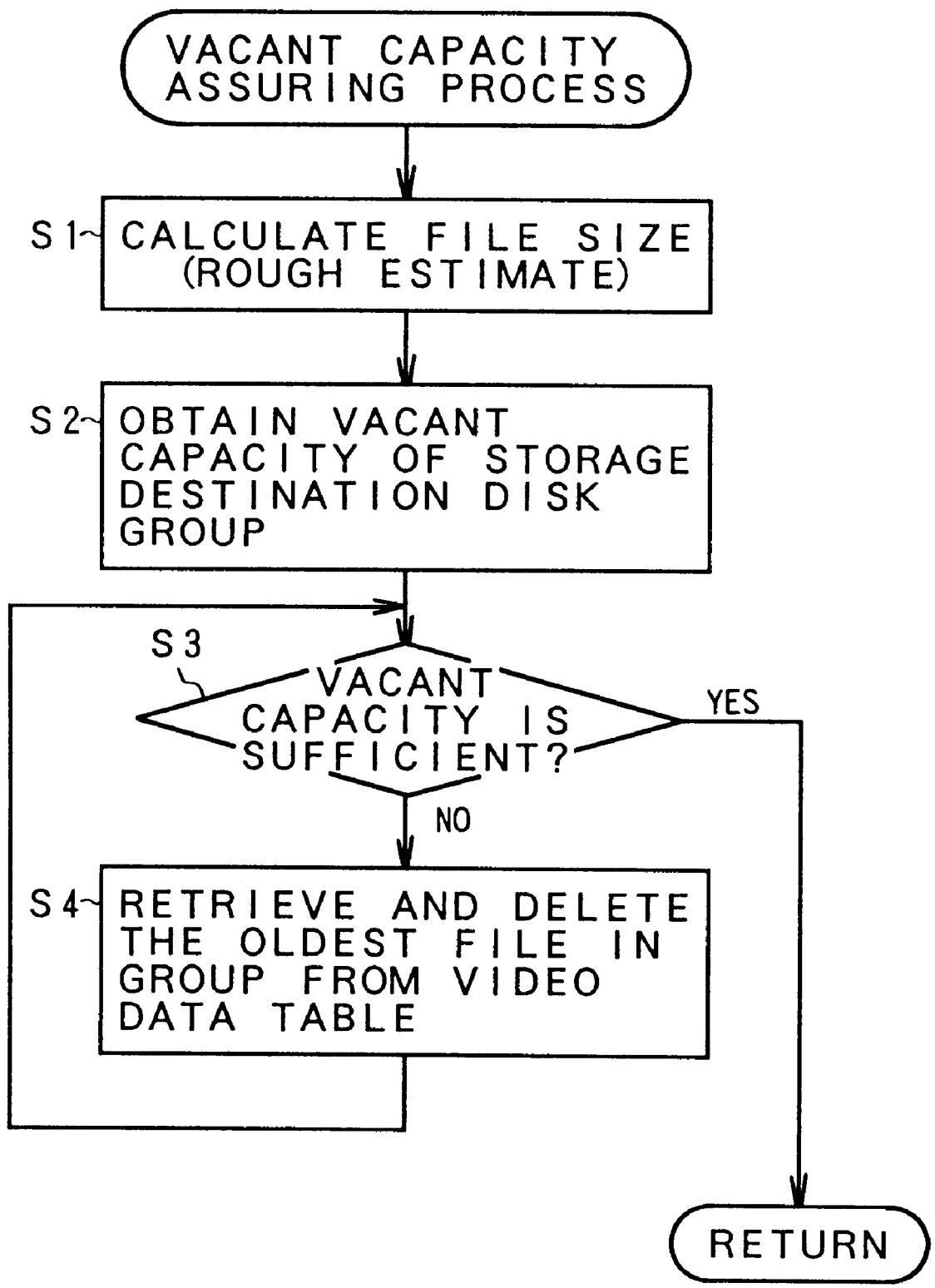
FIG. 13 is a flowchart for a vacant capacity assuring process in FIG. 10.

Referring again to FIG. 10, when the storage destination deciding process is finished in step S2, a vacant capacity assuring process to assure a vacant capacity into the decided storage destination is executed in step S3. When the vacant capacity can be assured in step S4, step S5 follows. When the vacant capacity cannot be assured, the processing routine is returned to step S2 and the storage destination deciding process is again executed and the vacant capacity is assured. The details of the vacant capacity assuring process in step S3 are as shown in a subroutine in FIG. 13. In the vacant capacity assuring process, first in step SI, a file size of the video file is calculated from the switching interval time. It is sufficient to calculate a rough estimate as a file size. In step S2, a vacant capacity of the decided storage destination disk group is obtained from the disk group information table 50 in FIG. 6 provided for the management server 22. When it is decided in step S3 that the obtained vacant capacity is sufficient, the processing routine is returned to the processing routine in FIG. 10. The processing routine advances from step S4 to a process in step S5. When the vacant capacity is insufficient in FIG. 13, step S4 follows. The video files included in the storage destination disk group are retrieved from the video data table 48 in FIG. 4 and the oldest video file is taken out and deleted, thereby assuring the vacant capacity. The vacant capacity is again checked in step S3. In the embodiment, the video files are stored by using the whole disk group. Therefore, when the vacant capacity is not enough, by deleting all of the video data included in the storage destination disk group, the vacant capacity is assured. For example, in FIG. 8, the disk groups 18-1 to 18-4 of the video servers 16-1 and 16-2 are sequentially switched as a storage destination and the video data is stored. During the storage to the last disk group 18-4, the next switching destination becomes the first disk group 18-1. Since there is obviously no vacant capacity in the disk group 18-1, in this case, all of the video data in the disk group 18-1 serving as a next storage destination is deleted, thereby assuring the vacant capacity for the next storage.

Referring again to FIG. 10, when the vacant capacity can be assured in step S4 by the vacant capacity assuring process in step S3, step S5 follows. The storing thread 38 is activated like a long time recording processing unit 36 in FIG. 8 and a storage preparing request is issued via the management server 22 to the video control process 44-1 of the video server 16-1 having the disk group 18-1 as a first storage destination which was decided. In response to the storage preparing request, the video control process 44-1 of the video server 16-1 executes a write preparing operation of the video data to the disk group 18-1. By receiving the connection of the storage preparation completion from the video server 16-1, it is notified to the storing thread 38 in step S6. Thus, a writing path of the video data to the disk group 18-1 serving as a storage destination is established from the storing thread 38. In step S7, when the storing thread 38 instructs the start of the encoding to the real-time encoder operation processing unit 40, the start of the encoding is instructed from the real-time encoder operation processing unit 40 to the NTSC/MPEG converting unit 32 of the real-time encoder 12. At the same time, the using right of the encoding data buffer 34 is captured. Thus, the encoding such that the stream of the video data of MPEG2 of the video image photographed by the video camera 10 is transmitted from the real-time encoder 12 and is stored from the storing thread 38 to the disk group 18-1 of the video server 16-1 serving as a storage destination in a real-time manner is started.

Figure 14:
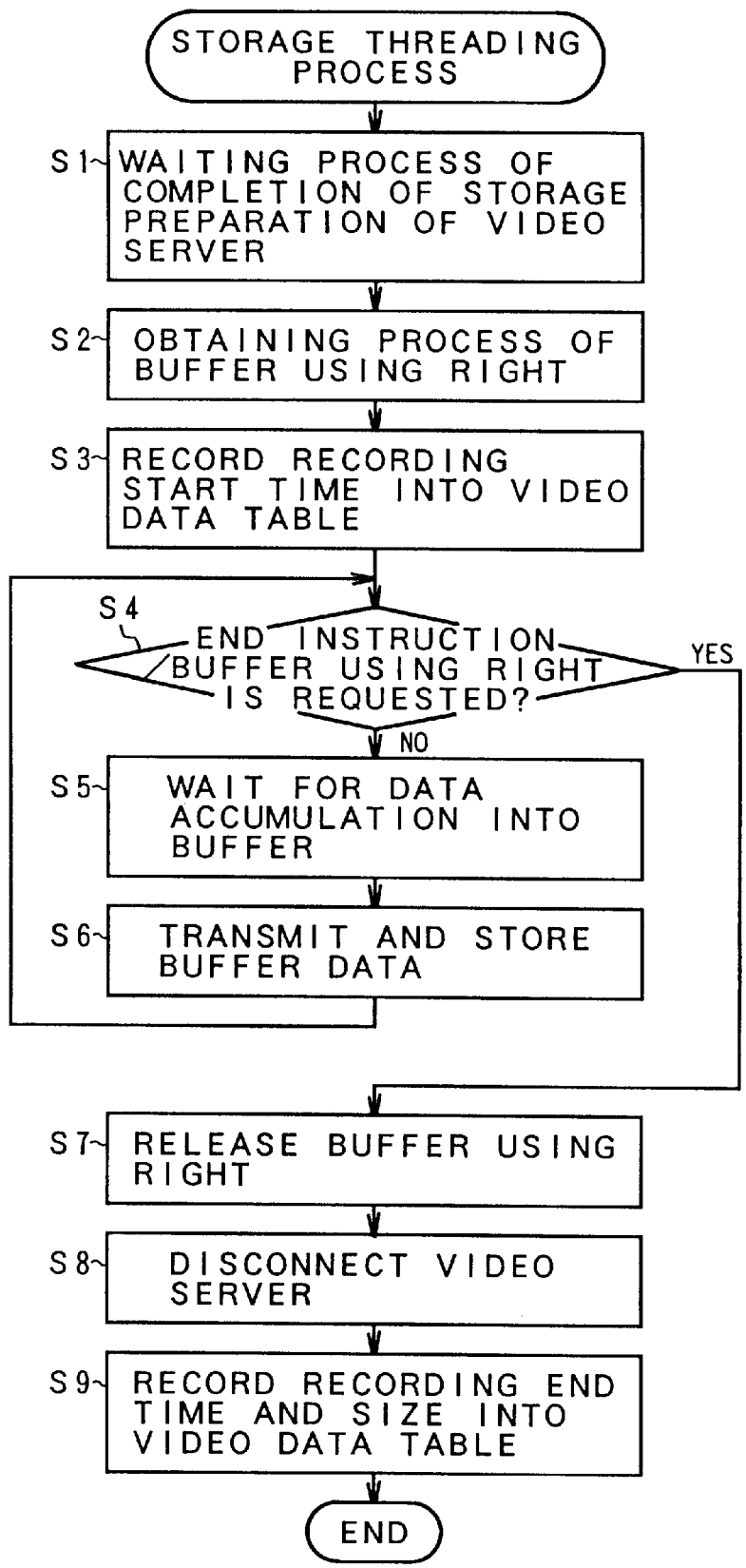
FIG. 14 is a flowchart for the processing operation of a storing thread provided for a continuous recording processing unit in FIG. 2.

FIG. 14 is a flowchart for the processing operation of the storing thread 38 provided in the long time recording processing unit 36 in FIG. 8. In the long time recording processing unit 36, when the present time approaches the switching timing which is determined by the switching interval time, the storing thread 38 is activated. In step S1, a process for waiting for the storage preparation completion from the video server is performed. That is, simultaneously with the activation of the storing thread, the storage preparation is requested to the video server having the disk group serving as a storage destination and the system waits for the connection. In response to the preparing request, when the storage preparation by the connection of the storing device of the video server 16 is completed, step S2 follows. A capturing process of the buffer using right for requesting the using right of the real-time encoding data buffer 34 provided in the real-time encoder 12 via the real-time encoder operation processing unit 40 and waiting for the capture of the using right is executed. When the buffer using right can be captured, the storage of the video data sent by the encoding of the real-time encoder 12 into the disk group of the storage destination is started. Thus, in step S3, a recording start time is recorded into the video data table 48 of the management server, namely, into the location information of the relevant video data of the recording start time 66 in the video data table 48 having the contents of FIG. 4. When the recording of the video data is started, a check is made in step S4 to see if there is a recording end instruction or there is a request for capturing the buffer using right to switch to the next storage destination. If there is none of the recording end instruction and the capture of the buffer using right, the system waits for the accumulation of the data into the real-time encoding data buffer 34 in step S5. When a predetermined amount of data is accumulated, the buffer data is transmitted and stored into the disk group as a storage destination by the storing thread 38 in step S6. When the present time approaches the switching timing based on the switching interval time, as shown in the time chart of FIG. 7, a new storing thread corresponding to the next storage destination is activated and the storage preparing request 106 is issued. A storage preparation completion state by the connection of the disk group 18-2 serving as a next storage destination is obtained for the storing buffer which was newly activated in response to the storage preparation completion 108. When the present time reaches the switching timing in the storage preparation completion state for the next storage destination, the new storing thread corresponding to the next storage destination requires the buffer using right. When the request for the buffer using right by the new storing thread for switching is discriminated in step S4, step S7 follows. The buffer using right held by the storing thread so far is released and transferred to the new storing buffer as a new storage destination. In step S8, the path to the video server having the disk group of the storage destination is disconnected. In final step S9, the recording end time 68 and file size 70 are recorded into the video data table 48 in FIG. 4 and the series of processes are finished. With respect to the storing thread which was newly activated in association with the switching of the storage destination, processes similar to those of the storing thread in FIG. 14 are also executed.

Figure 15:
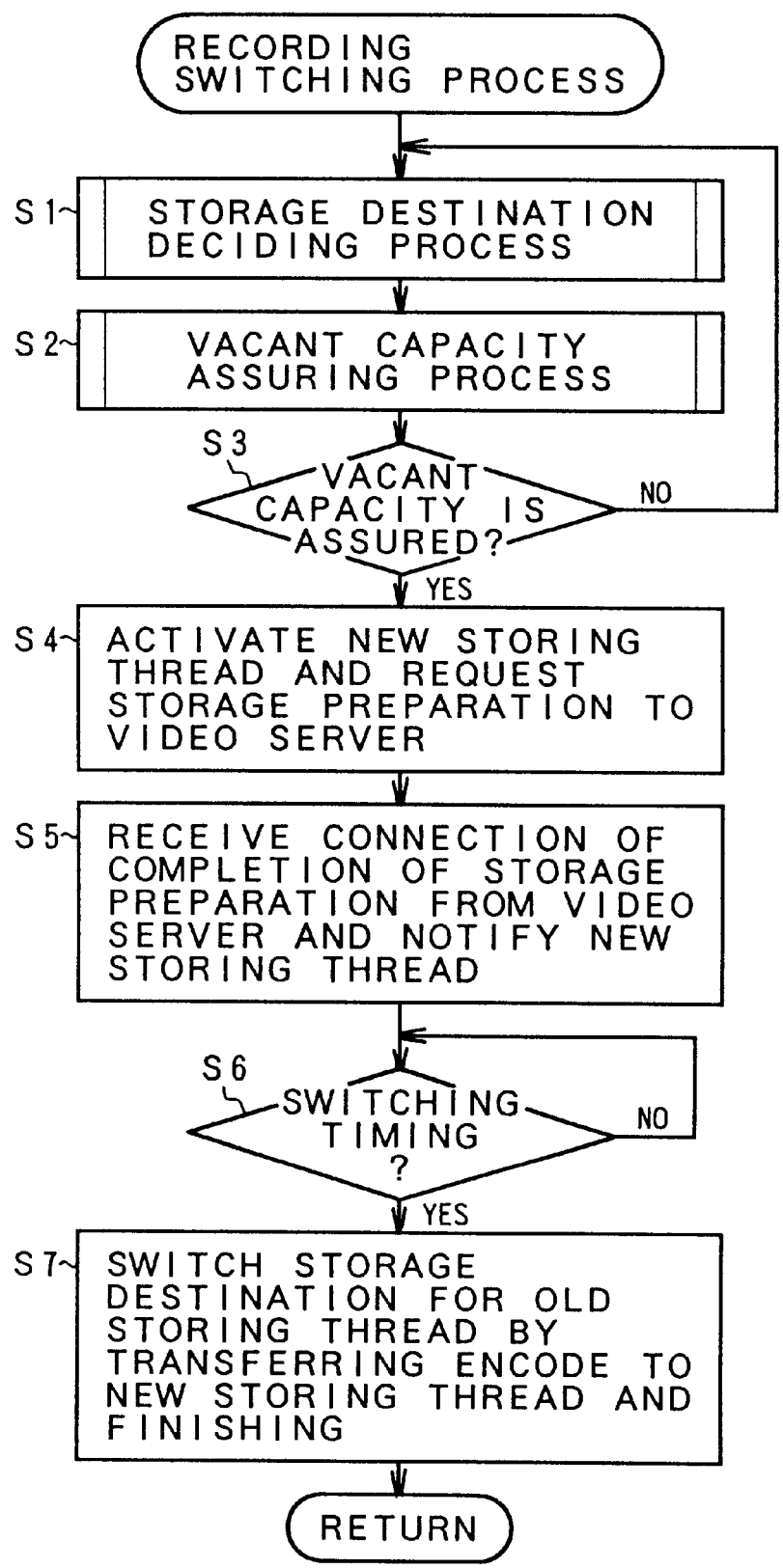
FIG. 15 is a flowchart for a recording switching process in FIG. 9.

FIG. 15 is a flowchart for the recording switching process in step S4 in FIG. 10. When the present time approaches the switching timing designated by the switching time interval, first in step S1, the next storage destination of the video file is determined. A vacant capacity is assured in step S2. When the assuring of the vacant capacity fails in step S3, the processing routine is returned to step S1 and the processes are again executed. The details of the process for assuring the vacant capacity are the same as those in the flowchart of FIG. 13. When the vacant capacity can be assured, the new storing thread is activated and the storage preparation is requested to the video server 16 in step S4. In step S5, the connection in association with the storage preparation completion from the video server 16 is accepted and is notified to the new storing thread. When the switching timing is discriminated in step S6, the old storing thread transfers the buffer using right to the new storing thread and the encoding is taken over and finished, thereby switching the storage destination.

Figure 16:
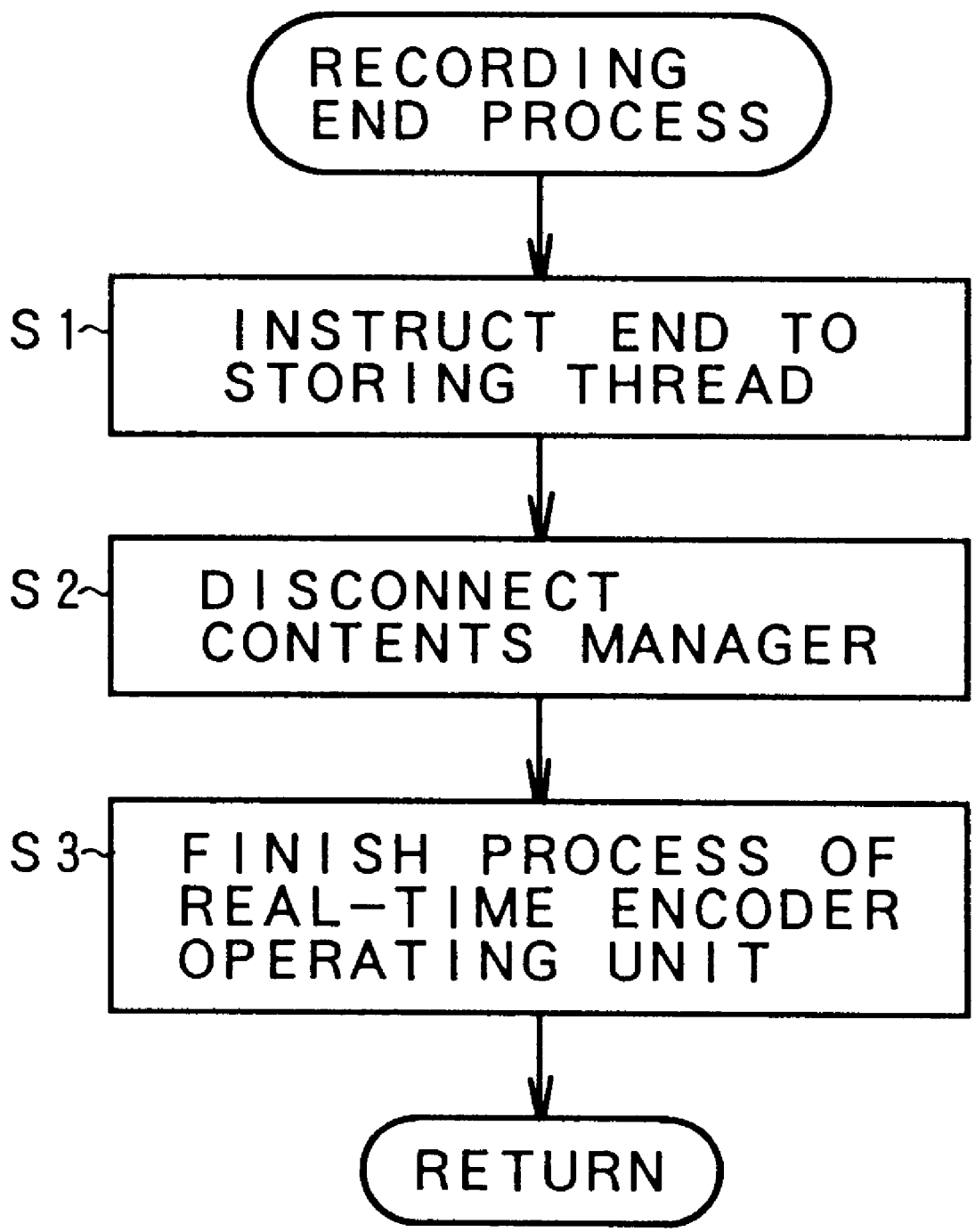
FIG. 16 is a flowchart for a recording end process in FIG. 9.

FIG. 16 is a flowchart showing the details of the recording end process in step S6 in FIG. 9 as a subroutine. In the recording end process, in step S1, an end instruction is issued to the storing thread which is at present operating and the storing thread which receives the end instruction disconnects the video server. In step S2, the storing thread disconnects the contents manager 46 of the management server 22. In final step S3, the process of the real-time encoder operation processing unit 40 is finished and the encoding operation of the real-time encoder 12 is stopped.

Figure 17:
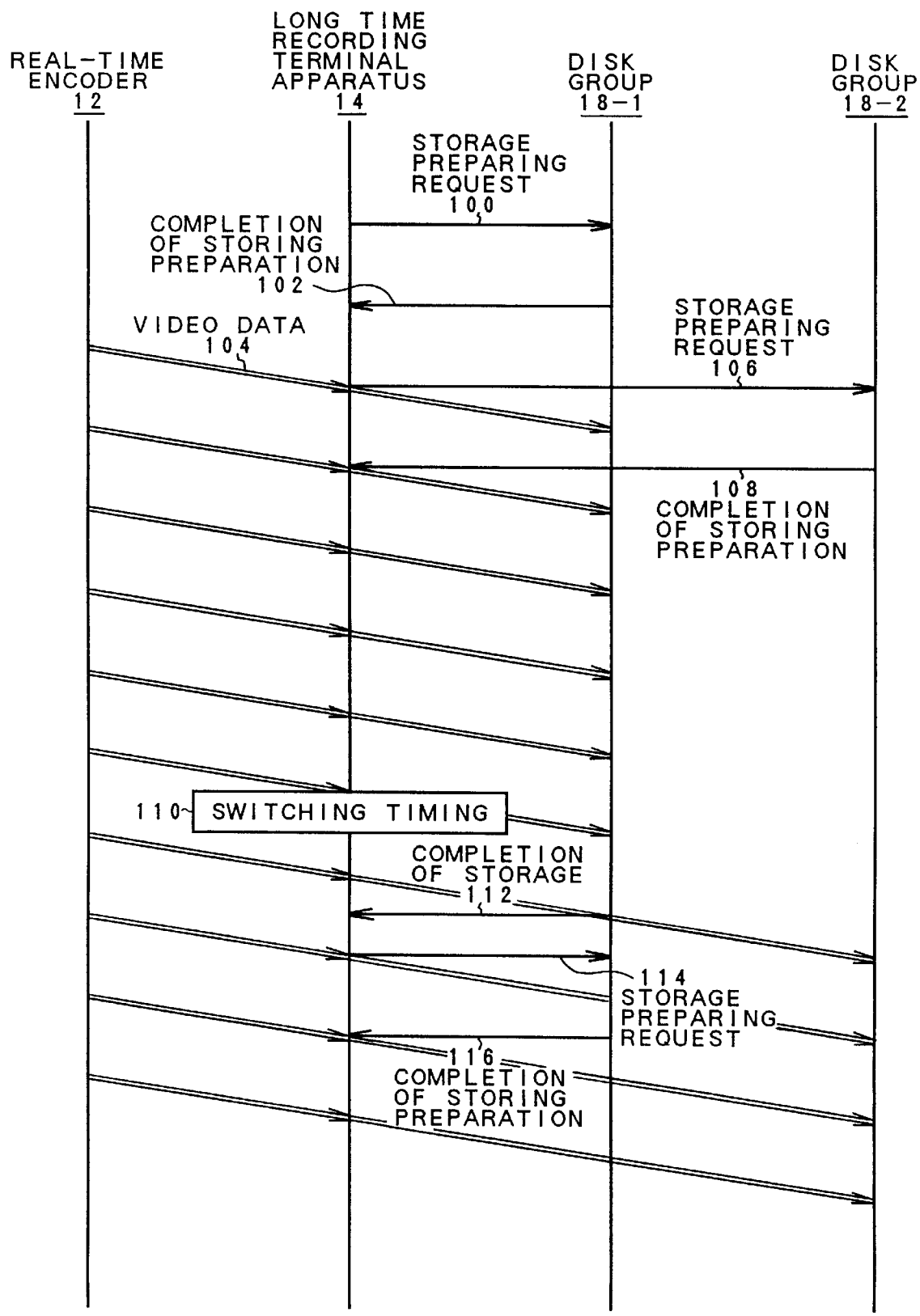
FIG. 17 is a time chart for another embodiment of the invention in which a preparation of a next storage destination is completed just after the start of the recording.

FIG. 17 is a time chart for another embodiment of the continuous recording process according to the invention. The embodiment is characterized in that the recording preparation for the next storage destination is executed just after the switching of the storage destination. Thus, a drop-out of the video data when an error occurs during the recording can be minimized. When the recording start is instructed to the long time recording terminal apparatus 14, the storage preparing request 100 is issued to the disk group 18-1 decided as a first storage destination. After waiting for a reply of the storage preparation completion 102, the recording of the video data 104 from the real-time encoder 12 is started. When the recording of the video data 104 is started, in the embodiment, the disk group 18-2 serving as a next storage destination is immediately determined and the storage preparing request 106 is issued. By receiving a reply of the storage preparation completion 108, a switching possible state for the disk group 18-2 serving as a next storage destination is established just after the start of the recording. The switching possible state denotes that the storing thread corresponding to the disk group 18-2 serving as a next storage destination is activated and the system is in a switching waiting state due to the capture of the buffer using right by the arrival at the switching timing 110 based on the switching interval time. As mentioned above, by completing the recording preparation for the next storage destination just after the switching of the storage destination, if an error should occur before reaching the switching timing, the storage destination is immediately switched to the next disk group 18-2 in the preparation completion state without needing to wait for a time that is required for deciding the storage destination and preparing after an error occurred. The drop-out of the video data when the error occurs can be minimized. Even in the case where the present time reaches the switching timing 110 and the storage destination is switched from the disk group 18-1 to the disk group 18-2 and a reply of the storage completion 112 is derived from the disk group 18-1, the storage preparing request 114 is issued to the disk group 18-1 serving as a next storage destination just after the reception of such a reply, a response of the storage preparation completion 116 is derived, and a storage switching possible state for the disk group 18-1 is always produced even during the recording to the disk group 18-2.

Figure 18:
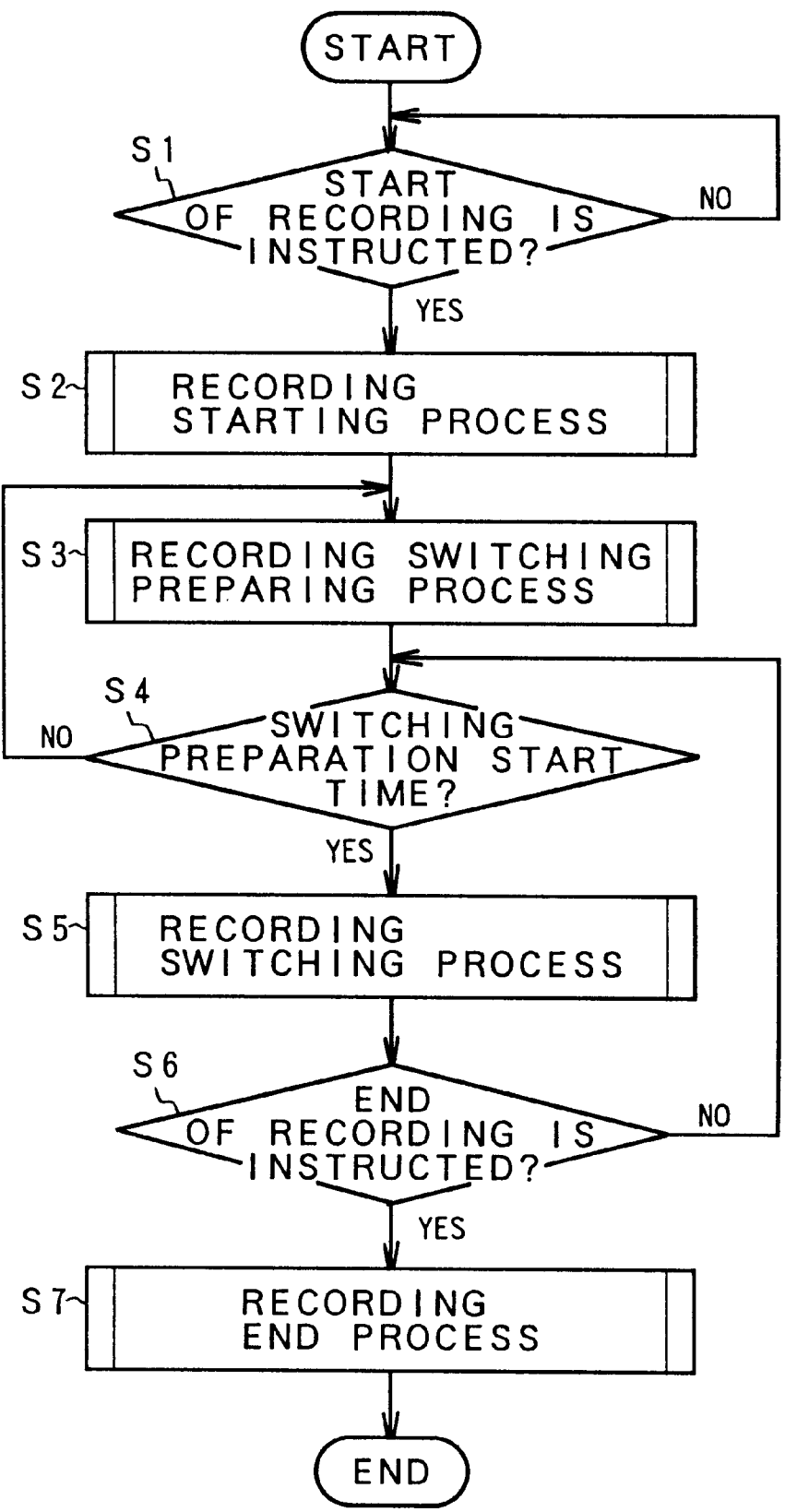
FIG. 18 is a flowchart for a continuous recording process in FIG. 17.

FIG. 18 is a flowchart for the continuous recording process according to the embodiment of executing the time chart of FIG. 17. The recording starting processes based on the recording start instruction in steps S1 and S2 are the same as those in the flowchart of FIG. 9. However, in step S3 subsequent to the recording start, a recording switching preparing process for the next storage destination is immediately performed. After that, a check is made in step S4 to see if the present time reaches the switching preparation start time. The recording switching process in step S5 after reaching the switching preparation start time, the discrimination about the end instruction in step S6, and the recording end process in step S7 when there is the end instruction are the same as those in steps S4, S5, and S6 in FIG. 9.

Parallel Recording

Figure 19:
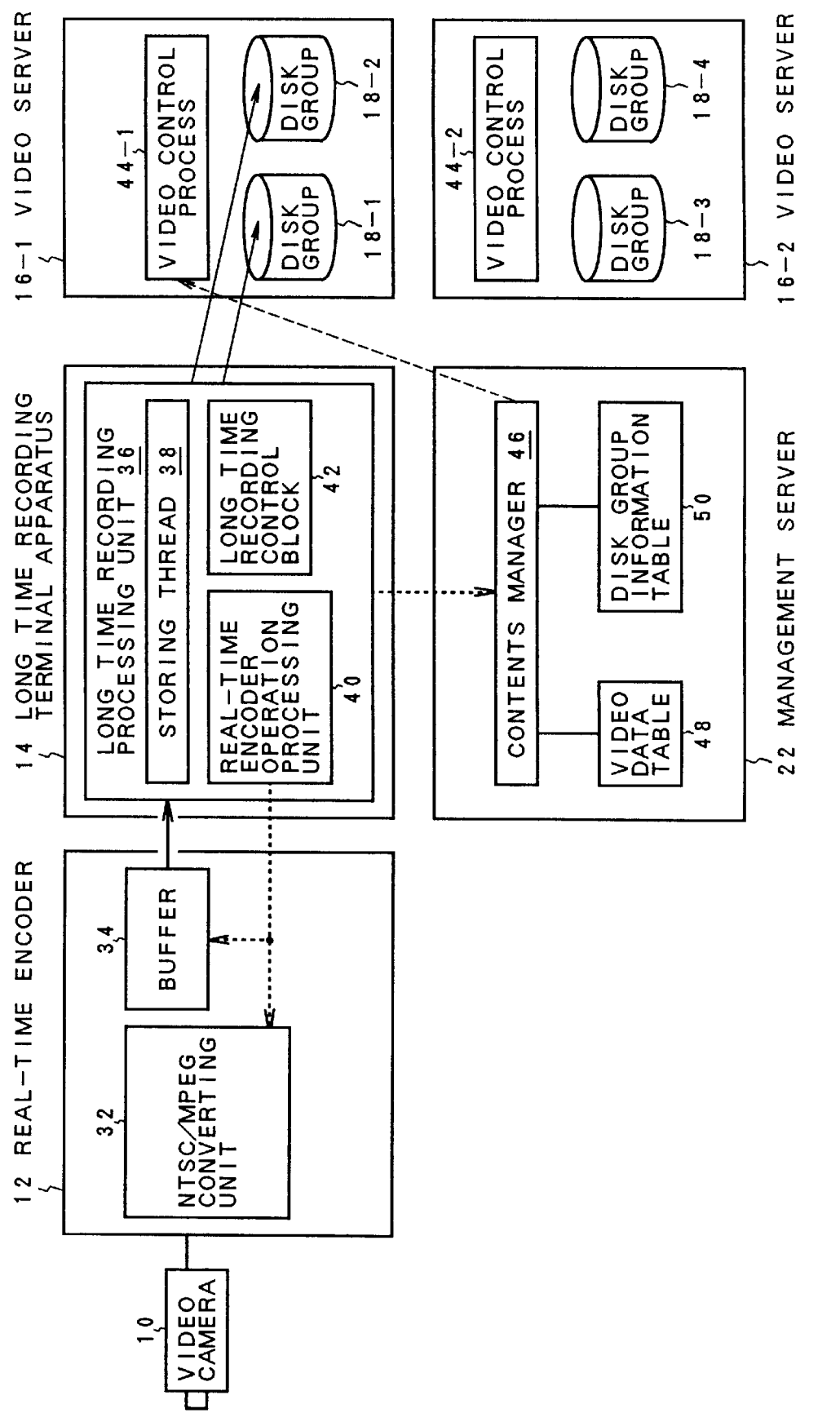
FIG. 19 is a block diagram of another embodiment of the invention in which digital video data is stored into a video server in parallel.

FIG. 19 shows another embodiment of the invention. The embodiment is characterized by raising the reliability by always recording the same video image into two storage destinations. When receiving the recording start instruction, the long time recording processing unit 36 provided for the long time recording terminal apparatus 14 requests the management server 22 to capture the two disk groups serving as storage destinations. For example, two disk groups 18-1 and 18-2 provided in the video server 16-1 are determined as storage destinations and a necessary vacant capacity is assured. When the disk groups 18-1 and 18-2 as two storage destinations can be decided, the long time recording processing unit 36 activates the storing thread 38 and issues the storage preparing request to the video control process 40-1 of the video server 16-1. In response to the storage preparing request, when the storage preparation for the disk groups 18-1 and 18-2 is completed, a storage preparation completion response is made to the long time recording processing unit 36 and the video server 16-1 is connected. Subsequently, the storing thread 38 activates the NTSC/MPEG converting unit 32 of the real-time encoder 12 through the real-time encoder operation processing unit 40 and captures the using right of the encoding data buffer 34, thereby sending the stream of the video data of MPEG2 and starting the parallel storage of the video data into the two disk groups 18-1 and 18-2 of the video server 16-1 serving as storage destinations. When the parallel storage of the video data is started, the long time recording processing unit 36 monitors a switching preparation start time when the present time approaches the preset recording switching interval time. When the present time reaches the switching preparation start time, two disk groups in which the video data is subsequently stored, for example, the disk groups 18-3 and 18-4 of the video server 16-2 are determined as storage destinations and a vacant capacity is assured. The storage preparing request is sent to the video server 16-2 side by the activation of the new storing thread to store the video data after the switching. The connection of the video server 16-2 side based on the response of the storage preparation completion is received. When the present time reaches the switching timing based on the switching interval time in this state, the storing thread before switching releases the buffer using right and transfers the buffer using right to the new storing thread in the storage preparation completion state after the switching. Therefore, the storage destinations of the video data are switched from the parallel storage into the disk groups 18-1 and 18-2 of the video server 16-1 to the parallel storage into the two disk groups 18-3 and 18-4 of the video server 16-2. By this switching, as for the same two disk groups 18-1 and 18-2 of the video server 16-1 in which the recording was finished, if the recording operations for both disk groups are successful, one recording data, for example, only the recording data of the disk group 18-1 is left and the recording data of the other disk group 18-2 is erased. When it is recognized by the end of the recording that the recording of either one of the disk groups 18-1 and 18-2 fails, the recording data of a normal one of the disk groups in which the recording doesn't fail is left. By the parallel recording to the two storage destinations as mentioned above, even if the recording on one storage destination side fails during the recording, so long as the recording on the other storage destination side continues, the video image is not lost. When the recordings to both of the storage destinations are successful, the recording data of one storage destination is deleted. Therefore, a vain operation due to the double preservation of the recording data can be omitted.

Figure 20:
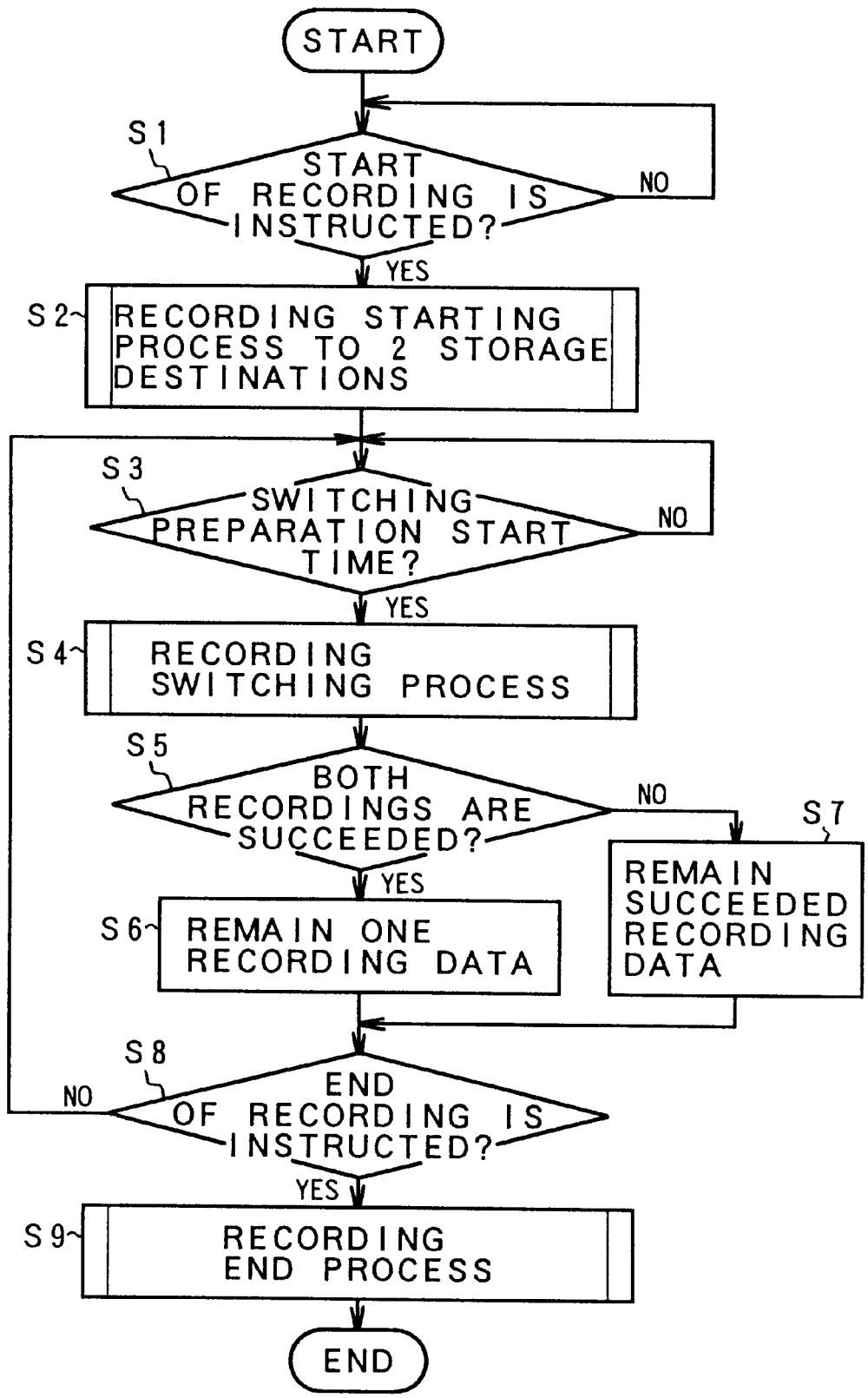
FIG. 20 is a flowchart for a continuous recording process according to the embodiment of FIG. 19.

FIG. 20 is a flowchart for the processing operation of the parallel recording in FIG. 19. When there is a recording start instruction in step S1, the recording starting process is executed in parallel to the two recording destinations on the video server side in step S2. During the recording, a check is made in step S3 to see if the present time has reached the switching preparation start time. When the present time reaches the switching preparation start time, step S4 follows. Next two storage destinations are prepared and a recording switching process for switching the storage destinations at a switching timing is executed. When the recording switching is finished, a check is made in step S5 to see if the recordings to both of the two storage destinations in which the recording was finished are successful. When both of the recordings are successful, the recording data of one storage destination is left in step S6. If either one of the recordings fails, the recording data of the successful storage destination is left in step S7. By repeating the processes in steps S3 to S7 as mentioned above until the recording end instruction is issued in step S8, the video data is continuously recorded. When there is the end instruction, a recording end process is executed in step S9 and the series of processes are finished.

Preservation of Necessary Video Data

Figure 21:
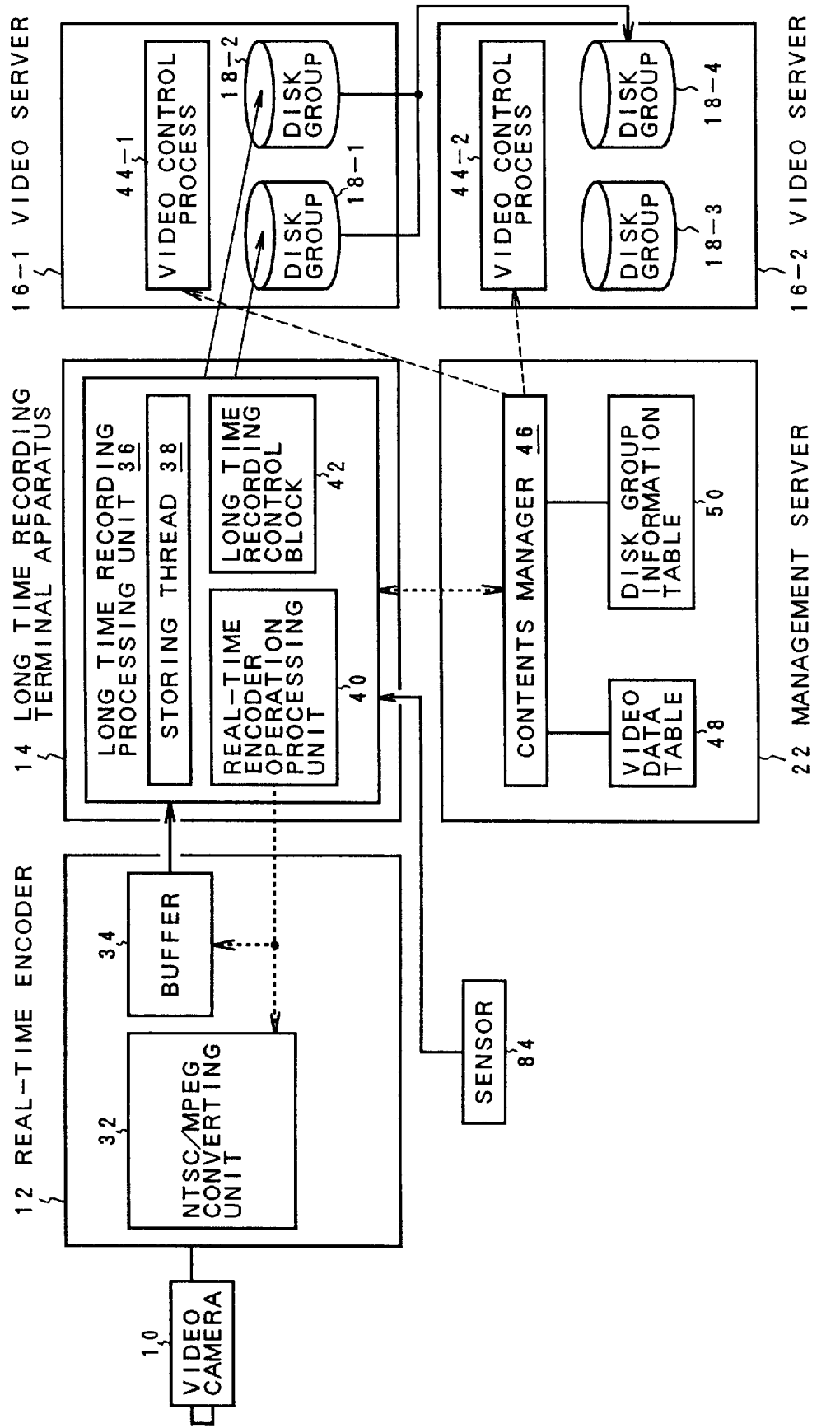
FIG. 21 is a block diagram of another embodiment of the invention in which recording data is refused due to the occurrence of an event by a sensor.

FIG. 21 shows another embodiment of a continuous recording system according to the invention. The embodiment is characterized in that when all of the video images recorded for a long time are not necessary, only the necessary video data is refuged and preserved by using a sensor and recording resources can be effectively utilized. A detection signal from a sensor 84 to monitor a state of a monitoring target of the video camera 10 is inputted to the long time recording terminal apparatus 14. As a sensor 84, for example, in the case where the monitoring target by the video camera 10 is a monitoring video image of a structure such as a debris barrier, a sensor to detect a destruction of the structure as a monitoring target is used. In the case where the monitoring video image by the video camera 10 is a target for the purpose of security to monitor persons who pass an entrance/exit of facilities, a sensor to detect the passage of the persons is used. When a notification of the occurrence of an event is received by the detection signal from the sensor 84, the long time recording processing unit 36 of the long time recording terminal apparatus 14 copies the video data from the position that is preceding to the present time point of the event occurrence by the time designated by the user from the video data of the disk group of the storage destination which is at present recording into the disk group for refuge. For example, since four disk groups 18-1 to 18-4 are provided in the video servers 16-1 and 16-2, three disk groups 18-1 to 18-3 among them are designated as storage destinations which are used for switching of the continuous recording and the remaining disk group 18-4 is decided as a storage destination to refuge the recording data as much as a predetermined time when the notification of the event occurrence is received from the detection signal of the sensor 84. Therefore, for example, when the disk group 18-1 is determined as a storage destination by the long time recording processing unit 36 and the notification of the event occurrence is received by the detection signal from the sensor 84 during the recording of the video data, the long time recording processing unit 36 allows the video control process 44-1 of the video server 16-1 to execute a copying process for copying the video data from the position that is preceding to the present time point of the disk group 18-1 during the recording by the time designated by the user into the disk group 18-4 for refuge. Thus, the video data as much as a predetermined time corresponding to the event occurrence based on the detection signal of the sensor 84 is preserved in the disk group 18-4 for refuge. In case of constructing a monitoring system for monitoring a destruction of a structure and a security system for monitoring the entering/leaving of the persons, only the necessary video data can be automatically refuged and preserved.

Figure 22:
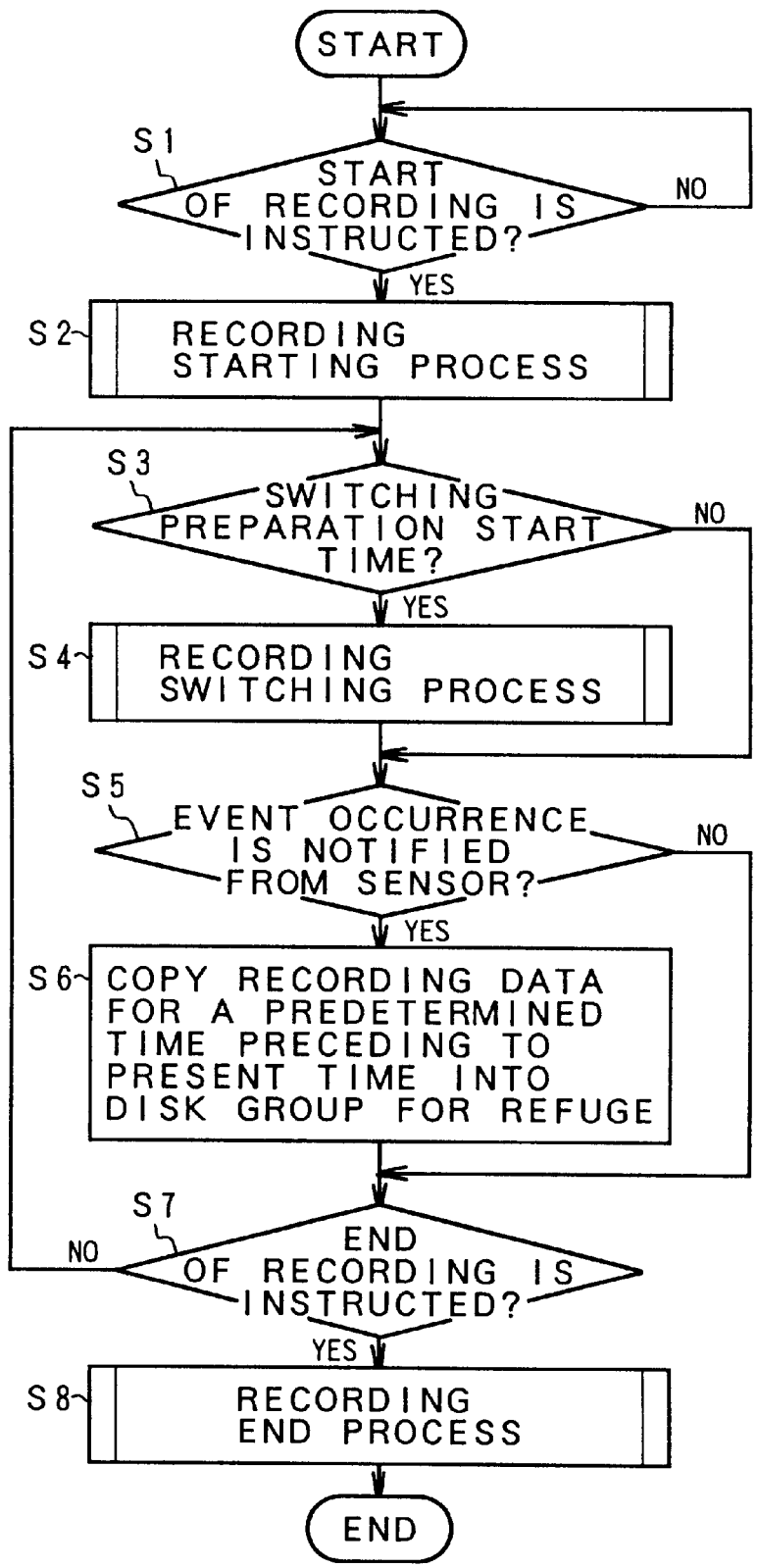
FIG. 22 is a flowchart for a continuous recording process according to the embodiment of FIG. 21.

FIG. 22 is a flowchart for the processing operation of an embodiment in which the necessary video data is automatically refuged and preserved in FIG. 21. When there is a recording start instruction in step S1, a recording starting process is executed in step S2. In step S3, the arrival at the switching preparation start time is monitored. When the present time reaches the switching preparation start time, a recording switching process for deciding the next storage destination, establishing the storage preparation completion before switching, and switching the storage destination at a switching timing is executed in step S4. Thus, the continuous recording is performed while successively switching the storage destination. When there is a notification of the event occurrence from the sensor during the recording in step S5, step S6 follows. The recording data which is preceding to the present time point by a predetermined time is copied into the disk group for refuge. The continuous recording in association with the notification of the event occurrence from the sensor is repeated until there is an end instruction in step S7. If there is the end instruction, a recording end process is executed in step S8 and the series of processes are finished.

Figure 23:
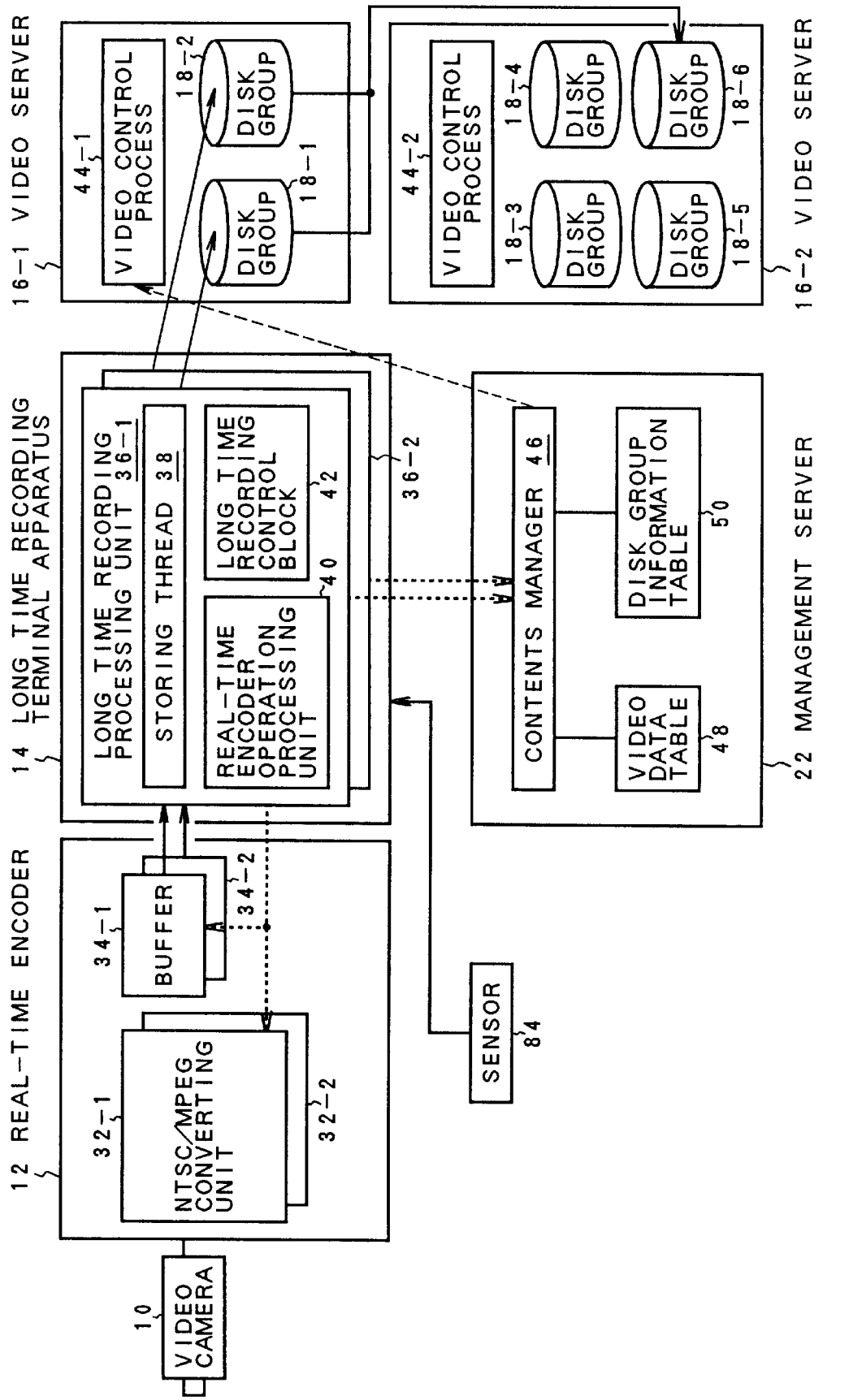
FIG. 23 is a block diagram of another embodiment of the invention in which high picture quality data is preserved and low picture quality data is preserved in the other portion due to the occurrence of an event by a sensor.

FIG. 23 shows another embodiment of the invention characterized in that the necessary video data is left as high picture quality data due to the event occurrence by the sensor detection signal. In the continuous recording system of the invention, in case of converting the video image into digital data and storing, there is a proportional relation between the picture quality and the data size. Therefore, it is necessary to leave the video images when an event to be monitored doesn't occur. However, in a case such that it is sufficient that the picture quality is low, as for the video data except for the case of the occurrence of an event, the picture quality is reduced and the resultant video data is stored, so that a storing capacity which is required on the storage destination side can be saved. In the embodiment of FIG. 23, an NTSC/MPEG2 converting unit 32-1 for encoding the high picture quality data and an NTSC/MPEG1 converting unit 32-2 for encoding the low picture quality data are provided and can transmit the MPEG2 high picture quality data and MPEG1 low picture quality data to the long time recording terminal apparatus 14 side via encoding buffers 34-1 and 34-2 in a real-time manner, respectively. In order to enable the high picture quality data and the low picture quality data to be transferred and stored in parallel, a long time recording processing unit 36-1 for the high picture quality and a long time recording processing unit 36-2 for the low picture quality are provided for the long time recording terminal apparatus 14. Each of the long time recording processing units 36-1 and 36-2 has the storing thread 38, real-time encoder operation processing unit 40, and long time recording control block 42. On the basis of a recording start instruction, the long time recording processing units 36-1 and 36-2 decide, for example, the disk group 18-1 of the video server 16-1 as a storage destination of the MPEG2 high picture quality data and the disk group 18-2 as a storage destination of the MPEG1 low picture quality data and record the encoded high picture quality data and low picture quality data in parallel, respectively. During the recording of the high picture quality data and low picture quality data to the disk groups 18-1 and 18-2 of the video server 16-1 as mentioned above, if the notification of the event occurrence as a monitoring target such as destruction of a structure, passage of persons, or the like is received by the detection signal of the sensor 84, the long time recording processing unit 36-1 for the high picture quality requests the video control process 44-1 of the video server 16-1 to execute the process such that the video data that is preceding to the time point of the event occurrence by a predetermined time designated by the user is copied and preserved into a predetermined disk group for refuge. As a disk group for refuge of the high picture quality data, for example, the disk group 18-6 among the four disk groups 18-3 to 18-6 provided in the video server 16-2 has previously been designated. Therefore, when there is the event occurrence notification by the detection signal of the sensor 84, the video data that is preceding to the time point of the event occurrence by the predetermined time in the disk group 18-1 is copied and preserved into the disk group 18-6 for refuge. When the present time reaches a predetermined switching interval time during the parallel recording of the high picture quality data and the low picture quality data to the disk groups 18-1 and 18-2, the storage destinations are switched to the disk groups 18-3 and 18-4 of the video server 16-2 decided as next storage destinations. With respect to the disk groups 18-1 and 18-2 in which the recording is finished by completion of the switching, in the video data of the low picture quality recorded in the disk group 18-2, the low picture quality data of the recording portion other than the high picture quality data refuged to the disk group 18-4 for refuge due to the event occurrence is extracted and copied into the disk group 18-4 for refuge. Thus, if there is no event, the low picture quality data of a small capacity is stored as a low picture quality video file into the disk group 18-4 for refuge every switching interval time. If there is the event occurrence during the recording, the high picture quality data as much as a predetermined time until the event occurrence is preserved as video files corresponding to the event occurrence. Thus, the video images of the necessary portion corresponding to the event occurrence can be left as high picture quality video data without increasing a storing capacity for preservation.

Figure 24:
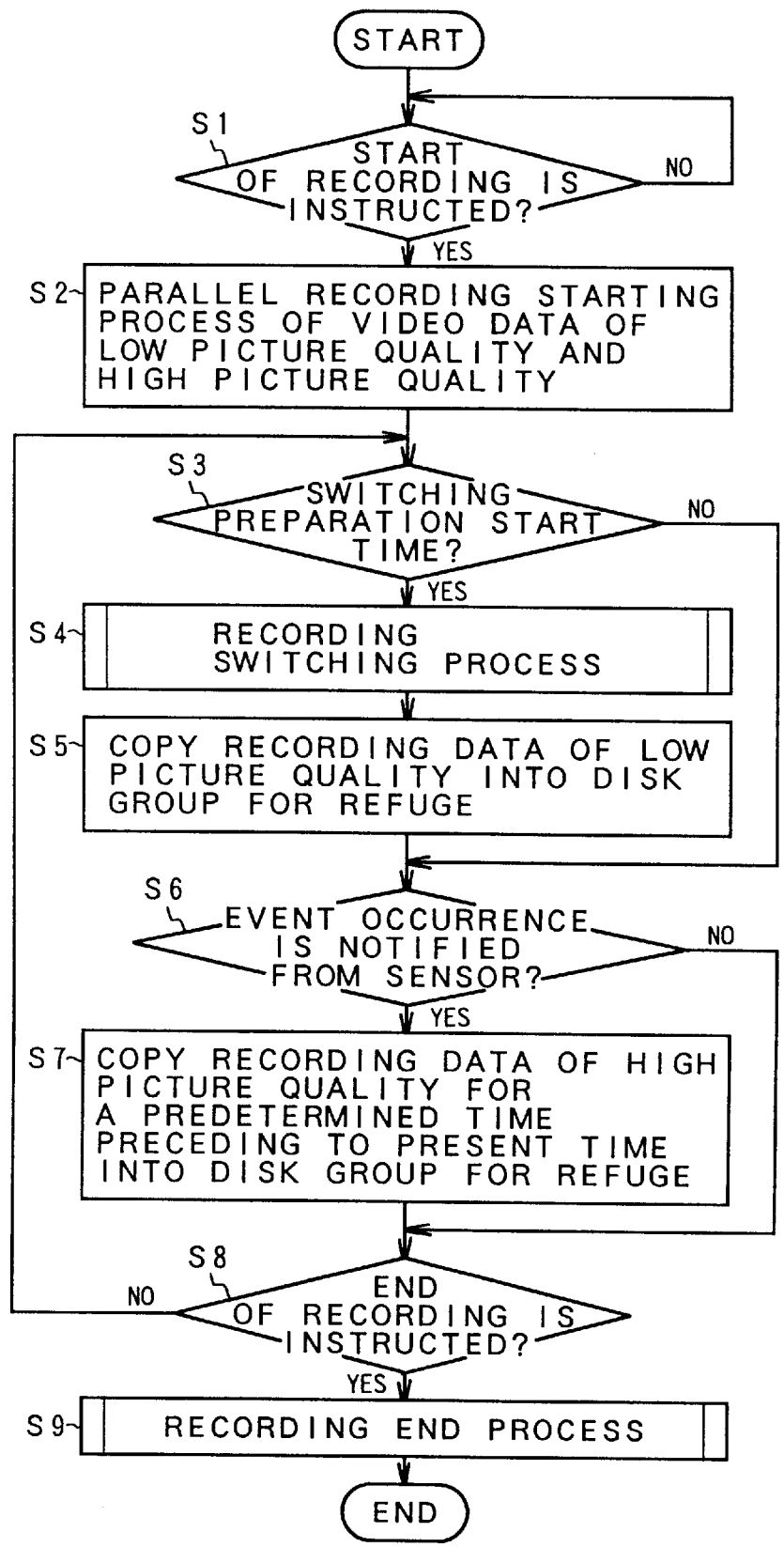
FIG. 24 is a flowchart for a continuous recording process according to the embodiment of FIG. 23.

FIG. 24 is a flowchart for the processing operation of an embodiment in which the necessary portion is left as video data of a high picture quality in FIG. 23. When there is a recording start instruction in step S1, two storage destinations on the video server side are designated and a parallel recording starting process of the video data of the low picture quality and high picture quality is executed in step S2. When the present time reaches a switching preparation start time during the parallel recording in step S3, step S4 follows. A recording switching process for preparing the next two storage destinations and switching them at a switching timing is executed. After completion of the recording switching process, the recording data of the low picture quality is copied to the disk group for refuge in step S5. When there is a notification of the event occurrence by the detection signal from the sensor during the recording in step S6, the recording data of the high picture quality that is preceding to the present time point by a predetermined time is copied into the disk group for refuge in step S7. The above processes are repeated until a recording end instruction is issued in step S8.

Figure 25:
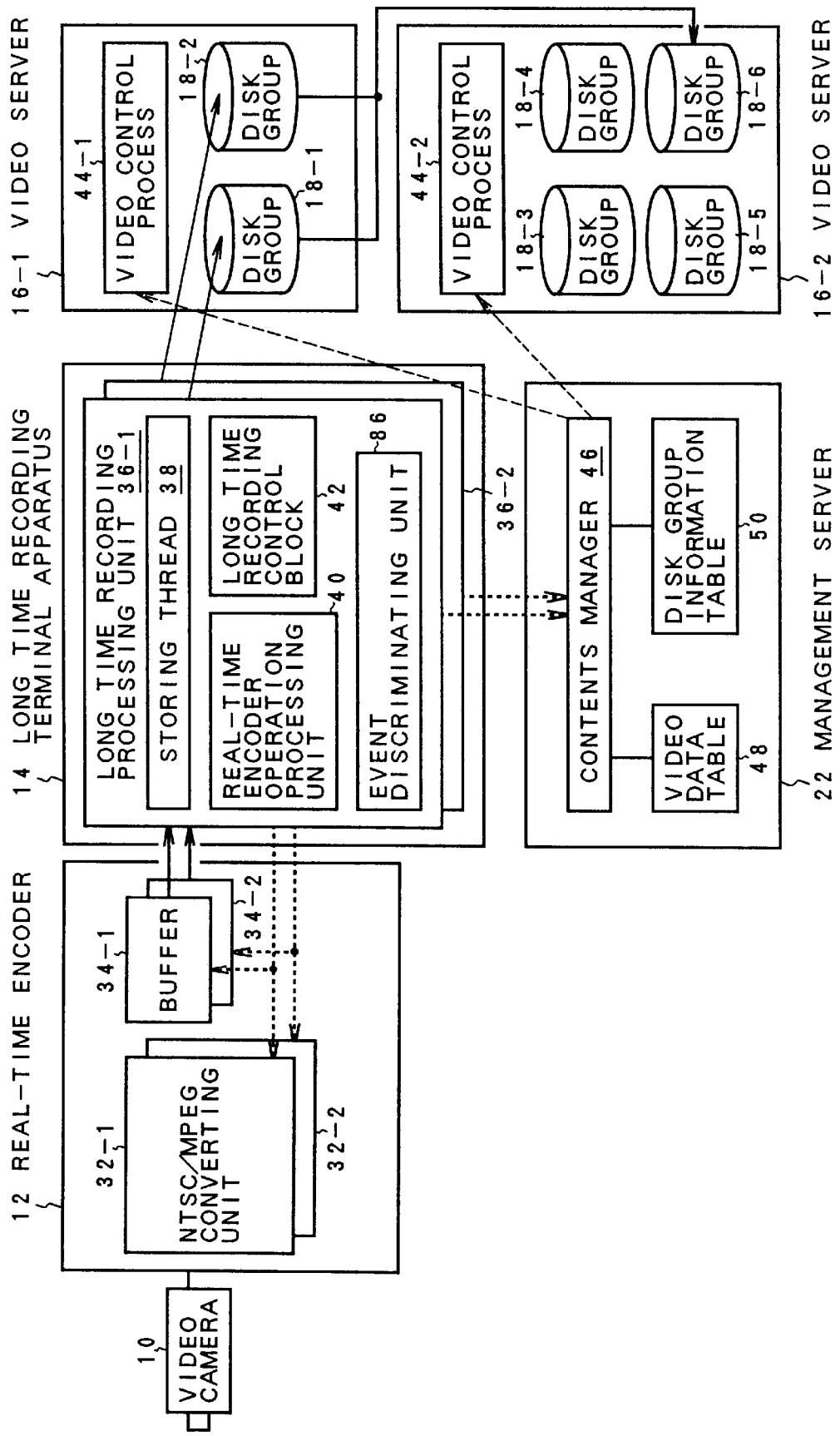
FIG. 25 is a block diagram of another embodiment of the invention in which an event is discriminated from video data, high picture quality data is preserved, and low picture quality data is preserved in the other portion.

FIG. 25 shows another embodiment of the invention in which the same event occurrence as that in FIG. 23 is discriminated, the video data of a high picture quality is stored with respect to only the necessary portion, and the other portions are stored as low picture quality data. The embodiment is characterized in that the event occurrence is discriminated by analyzing a parameter of a head-out of the MPEG2 data stream as high picture quality video data which is sent from the real-time encoder 12 irrespective of the detection signal from the sensor. To discriminate the event occurrence from the parameter of the MPEG2 data stream, an event discriminating unit 86 is provided for the long time recording processing unit 36-1 for the high picture quality data provided in the long time recording terminal apparatus 14. The event discriminating unit 86 detects a change in image from a parameter included as header information in the data stream of MPEG2. When there is a rapid image change, the event occurrence is decided. As a parameter of MPEG2 which can be used to detect the image change, for example, differential information of the image can be used. That is, a DCT coefficient is described at the lowest level of the data structure of MPEG2. As the DCT coefficient is smaller, a difference between the image and a reference picture plane is smaller. Therefore, a threshold value of the DCT coefficient to discriminate a magnitude of the image change is set and when the DCT coefficient exceeding the threshold value is obtained, the event occurrence due to the large image change is discriminated.

As a parameter corresponding to the DCT coefficient, there are the following parameters.

|      |                             |
| ---- | --------------------------- |
| DDSL | (DCT DC Size Luminance)     |
| DDSC | (DCT DC Size Chrominance)   |
| DDD  | (DCT DC Differential)       |
| FDC  | (First DCT Coefficients)    |
| SDC  | (Subsequent DCT Coefficients) |

Therefore, it is sufficient to use any one of them. As another method of discriminating the event occurrence from the parameter of the data stream of MPEG2, there is a method of using information of a motion vector. Information regarding the movement of a macro block from the reference picture plane exists in the data of MPEG2. The macro block is a block obtained by collecting a plurality of DCT conversion blocks and dividing the picture plane into a few blocks. As motion information of the macro block, there are

|                             |
| --------------------------- |
| MHC (Motion Horizontal Code) |
| MVC (Motion Vertical Code)   |

As the motion information of the macro block is larger, the image change is larger, so that the event occurrence can be discriminated by it. Further, as a method of discriminating the event occurrence by detecting the image change from the data stream of MPEG2, there is a method of using the number of intramacro blocks. In MPEG2, although the difference from the reference picture plane is used, when the difference is too large, a block which directly describes the image information is used instead of the difference irrespective of the P picture or the I picture. Such a block is called an intramacro block. Therefore, if the presence of the intramacro block is detected, it is detected that there is a large change in image, so that the event occurrence can be discriminated by it. As a method other than the above methods, the event occurrence can be discriminated by detecting the image change by using a proper parameter of MPEG. When the event discriminating unit 86 determines the event occurrence by detecting that the image change is large from the data stream of MPEG2, in a manner similar to the embodiment of FIG. 23, for instance, while the high picture quality data is at present being recorded in the disk group 18-1 and the low picture quality data is at present being recorded in the disk group 18-2, with respect to the video data of the high picture quality of the disk group 18-1, the video data which is preceding to the time point of the event occurrence by a predetermined time designated by the user is copied and preserved into, for example, the disk group 18-2 of the video server 16-2 which has been preset as a storage destination for refuge. When the present time reaches a predetermined switching interval time and the recording mode is switched from the recording to the disk groups 18-1 and 18-2 to the recording to the disk groups 18-3 and 18-4 serving as next storage destinations, the low picture quality recording data in the portion in which the high picture quality recording data refuged due to the event occurrence is removed from the low picture quality recording data in the disk group 18-2 in which the recording has been completed is copied into the disk group 18-6 for refuge.

Figure 26:
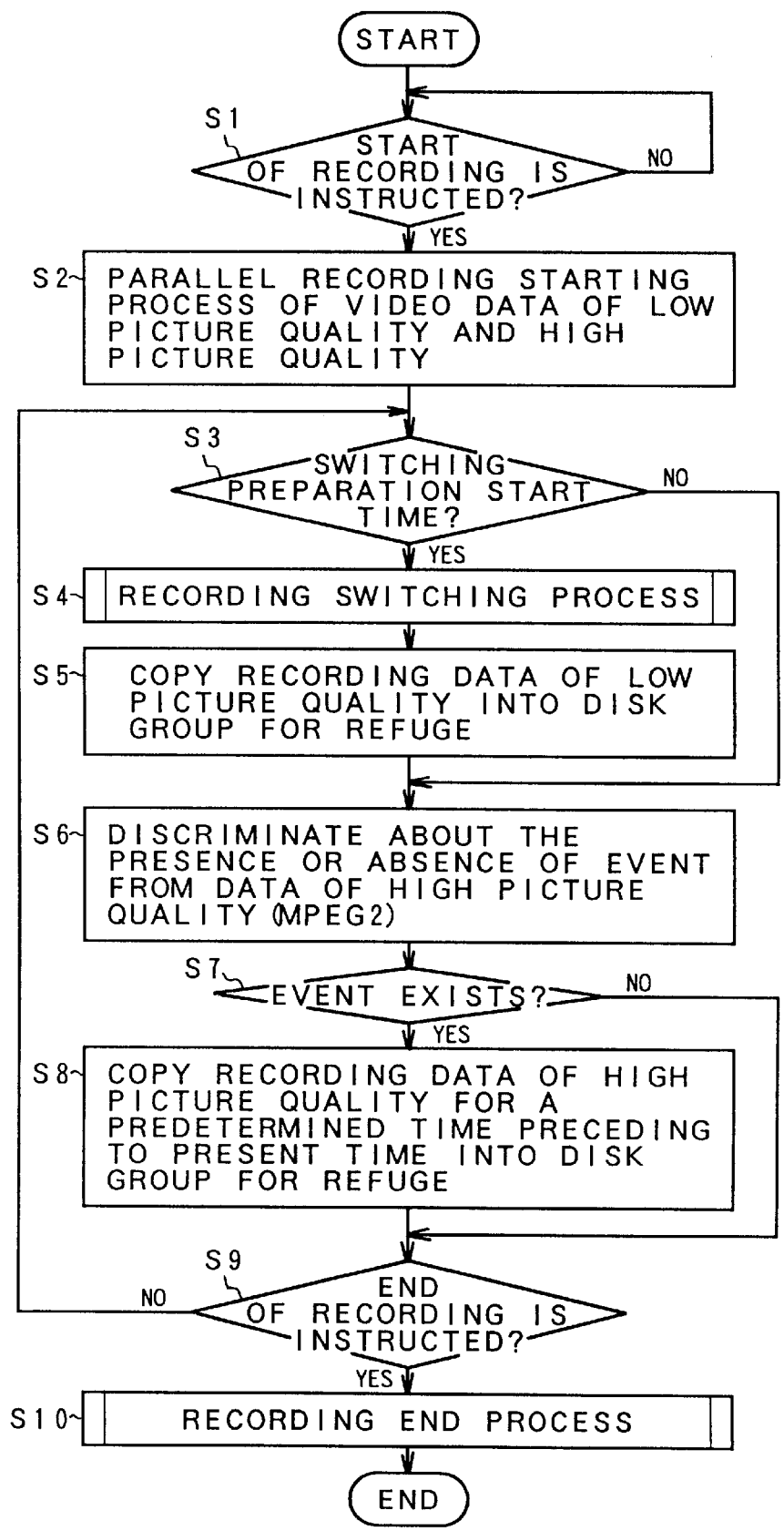
FIG. 26 is a flowchart for a continuous recording process according to the embodiment of FIG. 25.

FIG. 26 is a flowchart for the processing operation in case of discriminating the event occurrence from the data stream of the high picture quality of MPEG2 in FIG. 25. The recording process is fundamentally the same as that in case of discriminating the event occurrence from the detection signal of the sensor in FIG. 24 except that the presence or absence of the event occurrence is discriminated from the high picture quality data, namely, from the data stream of MPEG2 in step S6.

Figure 27:
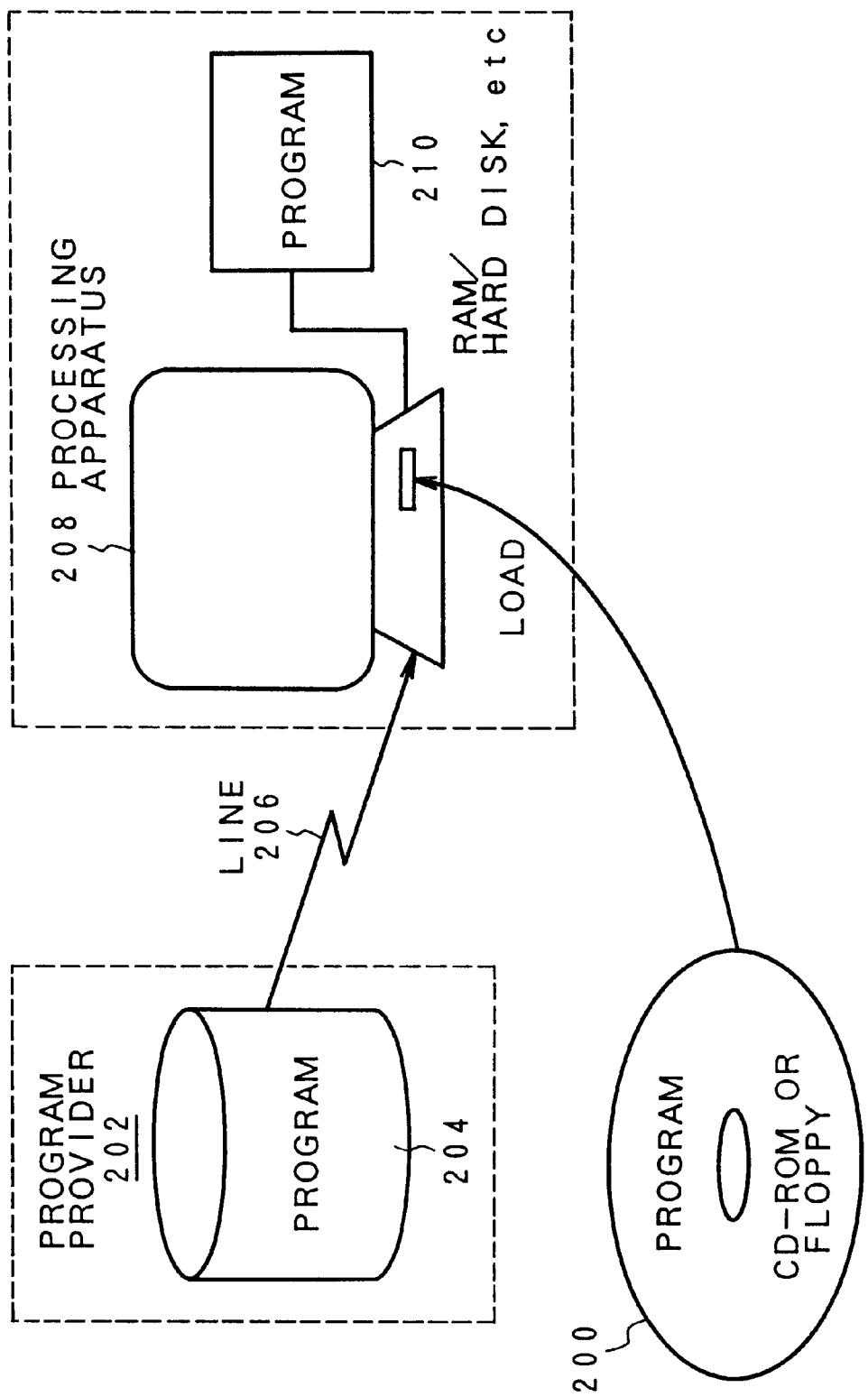
FIG. 27 is an explanatory diagram of an embodiment of a recording medium in which a continuous recording program has been recorded and which can be read out by a computer according to the invention.

FIG. 27 shows an embodiment of a recording medium in which the continuous recording program to execute the continuous recording process of the invention has been recorded and which can be read by a computer. As a recording medium, there are a removable recording medium 200 such as CD-ROM, floppy disk, or the like, a storing device 204 of a program provider 202 who provides a program by a line 206, and further, a memory device 210 such as RAM, hard disk, or the like of a processing apparatus 208 in which the program has been installed. The program provided by the recording medium is loaded into the processing apparatus 208 and is executed in the main storage.

According to the invention as mentioned above, by recording the digital video data while switching the storing devices serving as storage destinations, the video data of a length exceeding a capacity of one storing device serving as a storage destination can be continuously recorded without causing a drop-out of the video data. By continuing the recording while cyclically switching the storing devices serving as a plurality of storage destinations, a semipermanent continuous recording can be realized. Further, the event occurrence as a monitoring target is discriminated during the recording, the video data of the necessary portion is automatically refuged and preserved, and the video data of the necessary portion corresponding to the event occurrence is preserved without increasing the storing capacity for preservation and can be efficiently utilized for an image analysis after the event occurrence or a search of causes of the event occurrence. Owing to the association of the long time recording function and the recording function of the video server, by reproducing the video data during the recording in a real-time manner and transmitting to a reproducing terminal, the video image during the recording can be also monitored in a real-time manner. By associating the resources of the continuous recording of the video server with a database, a video image at an arbitrary time can be searched from a number of recorded video files and can be easily monitored. Further, with respect to the recording data divisionally preserved as a plurality of video files in the video server, by using the associating function for allowing the recording data to be seen as one continuous file, the recording video images can be continuously monitored without needing to switch the images on a video file unit basis.

Although the above embodiments have a form such that the long time recording terminal apparatus 14, video server 16, video reproducing terminal apparatus 20, and management server 22 are distributed and arranged through ATM networks 26, 28, and 30 as shown in FIG. 1, either the distributive arrangement or the collective system can be properly determined as necessary.

In the above embodiments, although the management of the operations of the long time recording terminal apparatus 14 and video server 16 and the management of the recording resources of the video server 16 have been performed by the management server 22, the function of the management server 22 can be also provided for the long time recording terminal apparatus 14 side or video server 16 side instead of the exclusive-use apparatus.

Further, in the system configuration of FIG. 1, the analog video signal from the video camera 10 has been encoded into the digital video signal in a real-time manner and has been continuously recorded. However, it will be obviously understood that the video signal from the video camera 10 is once recorded to the VTR and, after that, it is reproduced and supplied to the real-time encoder 12 as necessary, thereby continuously recording to the video server 16.

The invention, further, is not limited by the numerical values shown in the above embodiments. Moreover, the invention incorporates proper variations and modifications within the purview of the spirit of the invention without departing from the objects of the invention.

What is claimed is:

1. A continuous recording system comprising:
   a real-time encoder for converting an analog video signal inputted from a video camera into digital video data in a real-time manner and transmitting;
   a video server, having a plurality of storing devices, for storing the inputted digital video data into said storing devices in a real-time manner and transmitting the digital video data read out from said storing devices to a terminal apparatus for reproducing an image; and
   a long time recording terminal apparatus having a long time recording processing unit for storing the digital video data sent from said real-time encoder into said storing devices while sequentially switching said plurality of storing devices of said video server, thereby continuously recording said digital video data,
   wherein said long time recording processing unit operates such that:
      a recording preparation to a specific recording apparatus is requested to said video server on the basis of a recording start instruction;
      an encoding of said real-time encoder is started on the basis of a notification of completion of the recording preparation from said video server, and while receiving the transmitted digital video data, said digital video data is stored into said storing devices of said video server;
      a predetermined switching interval time of the recording apparatus is monitored, at a stage where said switching interval time approaches, the recording preparation to a next recording apparatus is requested to said video server, and a recording preparation completion state which can be switched is accomplished; and
      at a time point when reaching said switching interval time, a storage destination of said digital video data is switched from the storing device in which the data is at present being stored to another storing device in the recording preparation completion state.

2. A system according to claim 1, wherein said long time recording processing unit
   decides the storing device having a storing capacity corresponding to said switching interval time as a vacant capacity as a storage destination, and
   when the storing device having the vacant capacity doesn't exist, deletes the storing device having the oldest storage contents and decides to a next storage destination.

3. A system according to claim 1, wherein said long time recording processing unit comprises:
   a long time recording control block in which a predetermined switching interval time, a name of a video file to be stored, and the number and names of said storing devices of storage destinations have been defined;
   a storing thread which is activated by the storage preparation completion of said video server, captures a using right of a transfer buffer provided for said real-time encoder on the basis of the defined information in said long time recording control block, and activates an encoding, thereby allowing the digital video data to be transmitted and stored into said storing devices of said video server;
   an encoder operation processing unit for transferring an operating instruction from said storing thread to said real-time encoder and allowing the transmission of the digital video data to be controlled,
   wherein at the stage when the switching interval time of said storing device of said video server approaches, a new storing thread corresponding to the storing device on a switching destination side is activated, the recording preparation completion state is accomplished, the buffer using right is released to an old storing thread before the switching at the switching time point, and the using right is allowed to be captured by said new storing thread, thereby switching the storage destination of the digital video data to a next storing device.

4. A system according to claim 1, further comprising a management server for managing operations of said video server and said long time recording processing unit and resources of the video data stored in said video server.

5. A system according to claim 1, wherein said management server comprises:
   a video data table for managing file names of video files stored in said storing devices of said video server, a recording start time, a recording end time, a file size, and the like;
   a storing device information table for managing device names of said storing devices provided for said video server, a whole capacity, a vacant capacity, and the like; and a contents manager for deciding the storing device of a storage destination of said video server with reference to said video data table and said storing device information table and responding a storage preparation completion in response to a storage preparing request from said long time recording processing unit.

6. A system according to claim 1, wherein said long time recording processing unit is constructed in a manner such that:

just after the start of the storage into said storing devices of said video server, the recording preparation to a next recording apparatus is requested to said video server, and a recording preparation completion state which can be switched is accomplished; and said switching interval time is monitored, and at a time point when reaching said switching interval time, a storage destination of said digital video data is switched from the storing device in which the data is at present being stored to another storing device in the recording preparation completion state.

7. A system according to claim 1, wherein said long time recording processing unit is constructed in a manner such that:

the digital video data from said real-time encoder is simultaneously stored into the two storing devices of said video server, and when switching to the storage to a next storing device, if the storage into both of the storing devices is normally finished, only the storage contents in one storing device are left and the storage contents in the other storing device are deleted, and in the case where the storage into one storing device is normally finished and the storage into the other storing device is abnormally finished, the storage contents in the storing device in which the storage has been normally finished are left.

8. A system according to claim 1, wherein when a predetermined event occurs, said long time recording processing unit reads out storage contents in the storing device until a predetermined time in the past from the event occurrence and copies into another storing device for refuge.

9. A system according to claim 1, wherein said long time recording processing unit is constructed in a manner such that:

high picture quality data and low picture quality data are transmitted from said real-time encoder and are stored into the two storing devices of said video server in parallel, when a predetermined event occurs, the video data of a high picture quality until a predetermined time in the past from the event occurrence is copied and left in a storing device for refuge, and when no event occurs, at the time of the switching of said storing devices, said low picture quality data is copied and left in said storing device for refuge.

10. A system according to claim 9, wherein the high picture quality data from said real-time encoder is a data stream of MPEG2 and the low picture quality data is a data stream of MPEG1.

11. A system according to claim 9, wherein said long time recording processing unit discriminates the event occurrence from a detection signal of a sensor.

12. A system according to claim 9, wherein said long time recording processing unit discriminates the event occurrence from the digital video data sent from said real-time encoder.

13. A system according to claim 12, wherein said long time recording processing unit discriminates the event occurrence by detecting a large image change from a parameter of the data stream of MPEG2 sent from said real-time encoder.

14. A system according to claim 1, wherein said storing device provided in said video server is a large capacity storing device using a disk array.

15. A continuous recording method comprising:

a video data converting step of converting an analog video signal inputted from a video camera into digital video data in a real-time manner by a real-time encoder and transmitting;

a long time recording step of storing the digital video data sent from said real-time encoder into a plurality of storing devices of a video server while sequentially switching said storing device, thereby continuously recording said digital video data; and a recording and reproducing step of reading out the digital video data stored in a real-time manner in said storing devices of said video server and transmitting to a terminal apparatus for reproducing an image, wherein said long time recording step includes requesting to said video server a recording preparation to a specific recording apparatus on the basis of a recording start instruction, starting an encoding of said real-time encoder on the basis of a notification of completion of the recording preparation from said video server, and, while receiving the transmitted digital video data, storing said digital video data into said storing devices of said video server, monitoring a predetermined switching interval time of the recording apparatus, and, at a stage where said switching interval time approaches, requesting to the video server the recording preparation to a next recording apparatus, and a recording preparation completion state which can be switched is accomplished, and switching a storage destination of said digital video data from the storing device in which the data is at present being stored to another storing device in the recording preparation completion state at a time point when reaching said switching interval time.

16. A method according to claim 15, wherein in said long time recording step, the storing device having a storing capacity corresponding to a predetermined switching interval time as a vacant capacity is decided as a storage destination, and when the storing device having the vacant capacity doesn't exist, the storing device having the oldest storage contents is deleted and is decided to a next storage destination.

17. A method according to claim 15, wherein in said long time recording step, a long time recording control block in which a predetermined switching interval time, a name of a video file to be stored, and the number and names of said storing devices of storage destinations have been defined is formed, a storing thread is activated by the storage preparation completion of said video server, a using right of a transfer buffer provided for said real-time encoder is captured on the basis of defined information in said long time recording control block, and an encoding is activated, thereby allowing the digital video data to be transmitted and stored into said storing devices of said video server, an operating instruction from said storing thread is transferred to said real-time encoder by an encoder operation processing unit, thereby allowing the transmission of the digital video data to be controlled, and at the stage when the said sing interval time of said storing device of said video server approaches, a new storing thread corresponding to the storing device on a switching destination side is activated, the recording preparation completion state is accomplished, the buffer using right is released to the old storing thread before the switching at the switching time point, and the using right is allowed to be captured by said new storing thread, thereby switching the storage destination of the digital video data to a next storing device.

18. A method according to claim 15, further comprising the step of managing operations of said video server and said long time recording processing unit and resources of the video data stored in said video server by a management server.

19. A method according to claim 18, wherein said management server is constructed in a manner such that:

file names of video files stored in said storing devices of said video server, a recording start time, a recording end time, a file size, and the like are managed by a video data table;

device names of said storing devices provided for said video server, a whole capacity, a vacant capacity, and the like are managed by a storing device information table; and the storing device of a storage destination of said video server is decided with reference to said video data table and said storing device information table and a storage preparation completion is replied by a contents manager in response to a storage preparing request to switch the storing devices.

20. A method according to claim 15, wherein in said long time recording step, just after the start of the storage into said storing devices of said video server, the recording preparation to a next recording apparatus is requested to said video server, and a recording preparation completion state which can be switched is accomplished, and said switching interval time is monitored, and at a time point when reaching said switching interval time, a storage destination of said digital video data is switched from the storing device in which the data is at present being stored to another storing device in the recording preparation completion state.

21. A method according to claim 15, wherein in said long time recording step, the digital video data from said real-time encoder is simultaneously stored into the two storing devices of said video server, and when switching to the storage to a next storing device, if the storage into both of the storing devices is normally finished, only the storage contents in one storing device are left and the storage contents in the other storing device are deleted, and in the case where the storage into one storing device is normally finished and the storage into the other storing device is abnormally finished, the storage contents in the storing device in which the storage has been normally finished are left.

22. A method according to claim 15, wherein in said long time recording step, when a predetermined event occurs, storage contents in the storing device until a predetermined time in the past from the event occurrence are read out and copied into another storing device for refuge.

23. A method according to claim 15, wherein in said long time recording step, high picture quality data and low picture quality data are transmitted from said real-time encoder and are stored into the two storing devices of said video server in parallel, when a predetermined event occurs, the video data of a high picture quality until a predetermined time in the past from the event occurrence is copied and left in a storing device for refuge, and when no event occurs, at the time of the switching of said storing devices, said low picture quality data is copied and left in said storing device for refuge.

24. A method according to claim 23, wherein the high picture quality data from said real-time encoder is a data stream of MPEG2 and the low picture quality data is a data stream of MPEG1.

25. A method according to claim 22, wherein in said long time recording step, the event occurrence is discriminated from a detection signal of a sensor.

26. A method according to claim 22, wherein in said long time recording step, the event occurrence is discriminated from the digital video data sent from said real-time encoder.

27. A method according to claim 26, wherein in said long time recording step, the event occurrence is discriminated by detecting a large image change from a parameter of the data stream of MPEG2 sent from said real-time encoder.

28. A method according to claim 15, wherein said storing device provided in said video server is a large capacity storing device using a disk array.

29. A recording medium in which a continuous recording program has been recorded and which can be read by a computer, comprising:

a long time recording processing module for continuously recording digital video data from a real-time encoder to convert and transmit an analog video signal inputted from a video camera in a real-time manner by storing said digital video data into a plurality of storing devices of a video server while sequentially switching said storing devices, wherein in said long time recording processing module, a recording preparation to a specific recording apparatus is requested to said video server on the basis of a recording start instruction, an encoding of said real-time encoder is started on the basis of a notification of completion of the recording preparation from said video server, and while receiving the transmitted digital video data, said digital video data is stored into the storing devices of said video server, a predetermined switching interval time of the recording apparatus is monitored, at a stage where said switching interval time approaches, the recording preparation to a next recording apparatus is requested to said video server, and a recording preparation completion state which can be switched is accomplished, and at a time point when reaching said switching interval time, a storage destination of said digital video data is switched from the storing device in which the data is at present being stored to another storing device in the recording preparation completion state.

* * * * *